United States Patent

Futatsudera et al.

(10) Patent No.: US 9,457,798 B2
(45) Date of Patent: Oct. 4, 2016

(54) HYBRID VEHICLE AND METHOD FOR CONTROLLING SAME

(71) Applicant: HONDA MOTOR CO., LTD., Tokyo (JP)

(72) Inventors: Akio Futatsudera, Wako (JP); Youichirou Fukao, Wako (JP); Toshimi Kaneko, Wako (JP); Masanori Matsushita, Wako (JP); Naoyuki Tanaka, Wako (JP); Hideaki Tsukahara, Wako (JP); Yohei Takeda, Wako (JP); Yuichiro Yamazaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/759,601

(22) PCT Filed: Jan. 11, 2013

(86) PCT No.: PCT/JP2013/050492
§ 371 (c)(1),
(2) Date: Jul. 7, 2015

(87) PCT Pub. No.: WO2014/109064
PCT Pub. Date: Jul. 17, 2014

(65) Prior Publication Data
US 2015/0353075 A1 Dec. 10, 2015

(51) Int. Cl.
| B60W 20/00 | (2016.01) |
| B60K 6/442 | (2007.10) |
| B60W 10/02 | (2006.01) |
| B60W 10/06 | (2006.01) |
| B60W 10/26 | (2006.01) |
| B60W 30/188 | (2012.01) |

(52) U.S. Cl.
CPC ............. *B60W 20/20* (2013.01); *B60K 6/442* (2013.01); *B60W 10/02* (2013.01); *B60W 10/06* (2013.01);
(Continued)

(58) Field of Classification Search
CPC ..... B60K 6/442; B60W 20/15; B60W 10/15; B60W 10/26; B60W 10/02; B60W 30/1882; B60W 20/20; B60W 20/40; B60W 10/06; B60W 2540/10; B60W 2510/0638; B60W 2510/081; B60W 2710/0644; B60W 2710/0666; B60W 2710/021; B60W 2710/242; Y10S 903/93; Y02T 10/6234
USPC ............. 701/22; 180/65.265, 65.28, 65.285; 903/930, 904, 917; 477/107, 3
See application file for complete search history.

(56) References Cited

U.S. PATENT DOCUMENTS

| 8,571,737 B2 | 10/2013 | Tamagawa |
| 8,761,986 B2 | 6/2014 | Tamagawa |

(Continued)

FOREIGN PATENT DOCUMENTS

| JP | 9-224304 A | 8/1997 |
| JP | 2000-136835 A | 5/2000 |

(Continued)

OTHER PUBLICATIONS

International Search Report dated Feb. 12, 2013, issued in corresponding application No. PCT/JP2013/050492 (1 page).

*Primary Examiner* — Marthe Marc-Coleman
(74) *Attorney, Agent, or Firm* — Westerman, Hattori, Daniels & Adrian, LLP

(57) ABSTRACT

A hybrid vehicle determines whether or not the drive mode thereof is shifted from a series drive to an engine direct coupled drive with a power transmission engaging/disengaging portion applied, derives a rotational speed at a drive wheel side of the power transmission engaging/disengaging portion which corresponds to a driving speed as an applying rotational speed of an internal combustion engine at which the power transmission engaging/disengaging portion is applied, and applies the power transmission engaging/disengaging portion by controlling the operation of the internal combustion engine when a difference in rotational speed between the rotational speed of the internal combustion engine and the applying rotational speed becomes equal to or smaller than a predetermined value after the shift to the engine direct coupled drive is determined.

10 Claims, 21 Drawing Sheets

(52) U.S. Cl.
CPC .............. *B60W 10/26* (2013.01); *B60W 20/15* (2016.01); *B60W 20/40* (2013.01); *B60W 30/1882* (2013.01); *B60W 2510/0638* (2013.01); *B60W 2510/081* (2013.01); *B60W 2540/10* (2013.01); *B60W 2710/021* (2013.01); *B60W 2710/0644* (2013.01); *B60W 2710/0666* (2013.01); *B60W 2710/242* (2013.01); *Y02T 10/6234* (2013.01); *Y10S 903/93* (2013.01)

(56) References Cited

U.S. PATENT DOCUMENTS

| | | | |
|---|---|---|---|
| 2010/0087287 A1* | 4/2010 | Tabata | B60K 6/40 477/3 |
| 2012/0245783 A1* | 9/2012 | Tamagawa | B60K 6/442 701/22 |
| 2012/0245785 A1 | 9/2012 | Tamagawa | |
| 2014/0025247 A1 | 1/2014 | Tamagawa | |
| 2014/0249709 A1 | 9/2014 | Tamagawa | |

FOREIGN PATENT DOCUMENTS

| | | |
|---|---|---|
| JP | 3052753 B2 | 6/2000 |
| JP | 2001-233070 A | 8/2001 |
| WO | 2011/074482 A1 | 6/2011 |
| WO | 2011/074483 A1 | 6/2011 |

\* cited by examiner

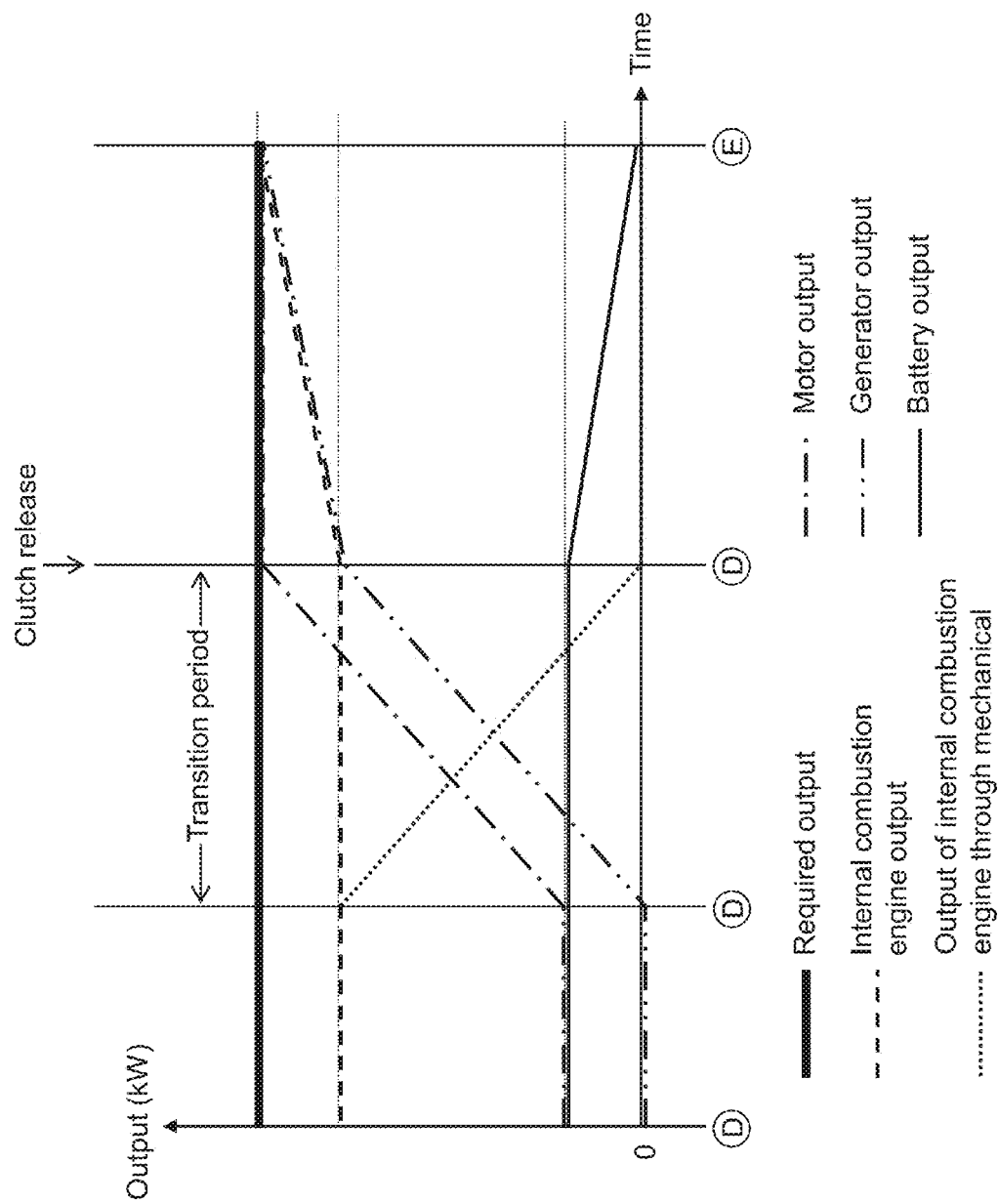

HYBRID VEHICLE AND METHOD FOR CONTROLLING SAME

TECHNICAL FIELD

The present invention relates to a hybrid vehicle wherein a power transmission engaging/disengaging portion is applied or released to switch a form of drive sources for driving and a method for controlling same.

BACKGROUND ART

In a series and parallel combined electric vehicle (SPHV) disclosed in Patent Literature 1, its drive mode is switched to a series hybrid vehicle (SHV) mode or a parallel hybrid vehicle (PHV) mode. In the SHV mode, a generator is driven by a mechanical output of an internal combustion engine, and a motor is driven by electric power generated by the generator and discharged electric power from a battery, whereby wheels are driven by the motor. In the PHV mode, the wheels are driven by the mechanical output of the internal combustion engine. When the vehicle is started, accelerated or slowed through braking, a portion of a required driving force which cannot be achieved by the mechanical output of the internal combustion engine is complemented by the motor.

When the drive mode is shifted from the SHV mode to the PHV mode, the torque of the generator is controlled at a point in time when the vehicle speed (the rotational speed of the motor) reaches a predetermined value V1, so that the rotational speed of the generator gradually comes close to the rotational speed of the motor. Thereafter, the clutch is engaged at a point in time when the rotational speeds of both the generator and the motor coincide with each other and the vehicle speed reaches a predetermined value V2, so that the generator the generator and the motor are coupled together mechanically. In addition, when the rotational speed of the motor becomes lower than the predetermined value in the PHV mode, the generator and the motor are decoupled mechanically by releasing the clutch, whereby the drive mode is switched to the SHV mode.

RELATED ART LITERATURE

Patent Literature

Patent Literature 1: JP-B-3052753
Patent Literature 2: JP-A-H09-224304
Patent Literature 3: International Publication No. 2011/074482
Patent Literature 4: International Publication No. 2011/074483

SUMMARY OF THE INVENTION

Problem that the Invention is to Solve

In the SPHV disclosed in Patent Literature 1 above, the coincidence of the rotational speed of the generator with the rotational speed of the motor is taken as a condition of switching the drive mode from the SHV mode to the PHV mode. However, although these two rotational speeds coincide with each other, it is considered that a shock is produced when the clutch is engaged in such a state that the output of the generator differs from the output of the motor. Namely, in the SPHV of Patent Literature 1, not only does the rotational speed of the generator need to coincide with the rotational speed of the motor, but also signs of angular speeds of the rotational speeds need to coincide with each other and the output of the generator needs to come close to the output of the motor.

FIGS. 20 and 21 are graphs showing an example of a characteristic of an internal combustion engine which drives a generator. In the graphs, an axis of ordinates represents the torque of the internal combustion engine, and an axis of abscissas represents the rotational speed of the internal combustion engine. In FIGS. 20 and 21, a thick solid line represents a line which connects operation points of the internal combustion engine where the least fuel consumption rate is obtained (hereinafter, referred to as a "BSFC bottom line"). In the SHV mode, the internal combustion engine is operated at the operation points on the line. Additionally, in FIGS. 20 and 21, an alternate long and short dash line represents a line which connects operation points of the internal combustion engine where the output remains the same although the torque and rotational speed differ (hereinafter, referred to as an "equioutput line").

In switching the drive mode of the SPHV of Patent Literature 1 to the PHV mode in such a state that the SPHV is in the SHV mode and the internal combustion engine is operated at an operation point A shown in FIG. 20, when the rotational speed of the internal combustion engine is lowered to a value (a desired rotational speed) indicated by a chain double-dashed line in FIG. 20 so that the rotational speed of the generator comes close to the rotational speed of the motor, an attempt to hold the fuel consumption rate shifts the operation point from A to B along the BSFC bottom line. As a result, because the rotational speed of the internal combustion engine is also lowered, the output of the internal combustion engine decreases. As this occurs, the generator cannot supply all the electric power that is required by the motor, resulting in a situation in which the battery has to supply electric power to compensate for the insufficiency.

On the other hand, when the operation point is shifted from A to C along the equioutput line with a view to holding the output of the internal combustion engine under the same conditions, the operation point deviates from the BSFC bottom line, and this deteriorates the fuel consumption rate.

This will also be true when the torque of the internal combustion engine is changed in switching the drive mode from the SHV mode to the PHV mode. As shown in FIG. 21, in switching the drive mode to the PHV mode from the state in which the internal combustion engine is operated at the operation point A, when the torque of the internal combustion engine is lowered to a value (a desired torque) indicated by a chain double-dashed line in FIG. 21, an attempt to hold the fuel consumption rate shifts the operation point from A to D along the BSFC bottom line. As a result, because the rotational speed of the generator which corresponds to the rotational speed of the internal combustion engine does not coincide with the rotational speed of the motor, it is considered that a shock is produced when the clutch is engaged in this state. Additionally, because the rotational speed and torque of the internal combustion engine are lowered, the output of the internal combustion engine decreases. As this occurs, the generator cannot supply all the electric power that is required by the motor, resulting in a situation in which the battery has to supply electric power to compensate for the insufficiency.

On the other hand, when the operation point is shifted from A to E along the equioutput line with a view to holding the output of the internal combustion engine under the same conditions, the operation point deviates from the BSFC bottom line, and this deteriorates the fuel consumption rate.

In addition, when the SPHV of Patent Literature 1 described above is in the PHV mode, the required driving force is obtained from the mechanical output of the internal combustion engine and from an assist output of the motor, depending upon situations. On the other hand, when the SPHV is in the SHV mode, the required driving force is obtained only from the output of the motor. Consequently, even though the clutch is released as a result of a clutch releasing condition being met when switching the drive mode from the PHV mode to the SHV mode, in the event that a change in the output of the motor which is required thereon is large, there may be a situation in which the required driving force cannot be given quickly.

For example, in the event that the state of charge of the battery is low when the drive mode is switched to the SHV mode, it is necessary that the generator is driven by the mechanical output of the internal combustion engine so as to drive the motor by the electric power generated by the generator. However, because the response of the internal combustion engine and the generator is not high, there may be a situation in which electric power corresponding to the required driving force cannot be supplied to the motor immediately after the clutch is released. As this occurs, because the motor cannot output the required driving force, a shock is produced when the clutch is released, resulting in a possibility that the driver feels the sensation of physical disorder. In addition, in order for the battery to compensate for the difference between the electric power required by the motor to meet the required driving force immediately after the clutch is released and the electric power generated by the generator, the battery needs to have a sufficient capacity.

An object of the invention is to provide a hybrid vehicle where a power transmission engaging/disengaging portion can be applied or released without causing a driver to have inharmonious feeling and without reduction in energy efficiency and a method for controlling same.

Means for Solving the Problem

With a view to achieving the object by solving the problem described above, according to claim 1 of the invention, there is provided a hybrid vehicle, including:

an internal combustion engine (for example, an internal combustion engine 111 in an embodiment), a generator (for example, a generator 113 in the embodiment) which is driven by the internal combustion engine to generate electric power, a battery (for example, a battery 101 in the embodiment) which supplies electric power to a motor, the motor (for example, a motor 109 in the embodiment) which is connected to drive wheels (for example, drive wheels 133 in the embodiment) and which is driven by electric power supplied from at least one of the battery and the generator, and a power transmission engaging/disengaging portion (for example, a clutch 117 in the embodiment) which is disposed between the generator and the drive wheels so as to engage or disengage a power transmission path from the internal combustion engine to the drive wheels via the generator, wherein the hybrid vehicle is driven by power from at least one of the motor and the internal combustion engine, and the hybrid vehicle includes:

an engine direct coupled drive shifting determination section (for example, an engine direct coupled drive shifting determination section 503 in the embodiment) for determining whether or not the hybrid vehicle shifts from a series drive in which the motor which is driven by electric power generated by the generator based on power of the internal combustion engine is used as a drive source to an engine direct coupled drive in which at least the internal combustion engine is used as a drive source with the power transmission engaging/disengaging portion applied, an applying rotational speed deriving section (for example, an applying rotational speed calculation section 505 in the embodiment) for deriving a rotational speed at a drive wheel side of the power transmission engaging/disengaging portion which corresponds to a driving speed of the hybrid vehicle as an applying rotational speed of the internal combustion engine at which the power transmission engaging/disengaging portion is applied, an internal combustion engine control section (for example, an internal combustion engine operation control section 507 in the embodiment) for controlling an operation of the internal combustion engine, and an engaging/disengaging control section (for example, a hydraulic circuit control section 509 in the embodiment) for controlling the power transmission engaging/disengaging portion so as to be applied when a difference in rotational speed between the rotational speed of the internal combustion engine and the applying rotational speed becomes equal to or smaller than a predetermined value after the engine direct coupled drive shitting determination section determines a shift to the engine direct coupled drive.

Further, according to claim 2 of the invention, there is provided the hybrid vehicle, wherein the internal combustion engine control section controls the internal combustion engine so as to be operated on a best fuel economy line which connects operation points where a least fuel consumption rate is obtained, in a case that a rotational speed of the internal combustion engine is higher than the applying rotational speed when the hybrid vehicle executes the series drive at a predetermined vehicle speed or faster.

Further, according to claim 3 of the invention, there is provided the hybrid vehicle, including:

a required driving force deriving section (for example, a required driving force deriving section 501 in the embodiment) for deriving a driving force required on the hybrid vehicle based on an accelerator pedal opening which corresponds to an accelerator pedal operation in the hybrid vehicle and a driving speed of the hybrid vehicle, wherein the internal combustion engine control section controls the internal combustion engine so as to be operated on an equioutput line which connects operation points where an output corresponding to the required driving force derived by the required driving force deriving section can be maintained, in a case that a rotational speed of the internal combustion engine is lower than the applying rotational speed when the hybrid vehicle executes the series drive at a predetermined vehicle speed or faster.

Further, according to claim 4 of the invention, there is provided the hybrid vehicle, wherein an energy transmission efficiency from the internal combustion engine to the drive wheels at an operation point which is reached as a result of an operation point of the internal combustion engine moving on the equioutput line and where the rotational speed of the internal combustion engine coincides with the applying rotational speed is such that a mechanical efficiency is better than an electric efficiency.

Further, according to claim 5 of the invention, there is provided a hybrid vehicle, including:

an internal combustion engine (for example, an internal combustion engine 111 in an embodiment), a generator (for example, a generator 113 in the embodiment) which is driven by the internal combustion engine to generate electric power, a battery (for example, a battery 101 in the embodiment) which supplies electric power to a motor, the motor (for example, a motor 109 in the embodiment) which is connected to drive wheels (for example, drive wheels 133 in the embodiment) and which is driven by electric power supplied from at least one of the battery and the generator, and a power transmission engaging/disengaging portion (for example, a clutch 117 in the embodiment) which is disposed between the generator and the drive wheels so as to engage or disengage a power transmission path from the internal combustion engine to the drive wheels via the generator, wherein the hybrid vehicle is driven by power from at least one of the motor and the internal combustion engine, and the hybrid vehicle includes:

a series drive shifting determination section (for example, a series drive shifting determination section 603 in the embodiment) for determining whether or not the hybrid vehicle shifts from an engine direct coupled drive in which at least the internal combustion engine is used as a drive source to a series drive in which the motor which is driven by electric power generated by the generator based on power of the internal combustion engine is used as a drive source with the power transmission engaging/disengaging portion released, a transmission ratio changing section (for example, a torque shifting control section 607 in the embodiment) for changing a ratio of an electrical transmission to a mechanical transmission of an output of the internal combustion engine, and an engaging/disengaging control section (for example, a hydraulic circuit control section 609 in the embodiment) for controlling the power transmission engaging/disengaging portion so as to be released when an output of the internal combustion engine through the mechanical transmission becomes equal to or smaller than a predetermined value after the series drive shifting determination section determines a shift to the series drive.

Further, according to claim 6 of the invention, there is provided the hybrid vehicle, including:

a battery output control section (for example, a management ECU 123 in the embodiment) for controlling an electric power supply from the battery to the motor, and an internal combustion engine control section (for example, the management ECU 123 in the embodiment) for controlling an operation of the internal combustion engine, wherein after the power transmission engaging/disengaging portion is released, the battery output control section decreases the electric power supplied from the battery to the motor, and the internal combustion engine control section controls the internal combustion engine so as to be operated on a best fuel economy line which connects operation points where a least fuel consumption rate is obtained so as to increase the output of the internal combustion engine in association with the decrease of the electric power supplied from the battery to the motor.

Further, according to claim 7 of the invention, there is provided the hybrid vehicle, including:

a required driving force deriving section (for example, the management ECU 123 in the embodiment) for deriving a driving force required on the hybrid vehicle based on an accelerator pedal opening which corresponds to an accelerator pedal operation in the hybrid vehicle and a driving speed of the hybrid vehicle, and an internal combustion engine control section (for example, the management ECU 123 in the embodiment) for controlling an operation of the internal combustion engine, wherein when the required driving force derived by the required driving force deriving section increases when the hybrid vehicle is driven by using the internal combustion engine as a drive source with the power transmission engaging/disengaging portion applied, the internal combustion engine control section increases the output of the internal combustion engine so as to satisfy the required drive force until an operation point reaches a best fuel economy line which connects operation points where a least fuel consumption rate is obtained, and when the required driving force exceeds the output of the internal combustion engine operated at an operation point on the best fuel economy line, the internal combustion engine control section operates the internal combustion engine on the best fuel economy line and the motor which is driven by electric power supplied from the battery outputs electric power which is good enough to compensate for a shortage of the output of the internal combustion engine to the required driving force.

Further, according to claim 8 of the invention, there is provided the hybrid vehicle, including:

an internal combustion engine control section (for example, the management ECU 123 in the embodiment) for controlling an operation of the internal combustion engine, wherein the internal combustion engine control section controls the operation of the internal combustion engine so as to maintain torque of the internal combustion engine constant by controlling torque of the motor for a time period from a start of changing the ratio of the electrical transmission to the mechanical transmission of the output of the internal combustion engine by the transmission ratio changing section to a completion of opening of the power transmission path.

Further, according to claim 9 of the invention, there is provided a control method of a hybrid vehicle including:

an internal combustion engine (for example, an internal combustion engine 111 in an embodiment), a generator (for example, a generator 113 in the embodiment) which is driven by the internal combustion engine to generate electric power, a battery (for example, a battery 101 in the embodiment) which supplies electric power to a motor, the motor (for example, a motor 109 in the embodiment) which is connected to drive wheels (for example, drive wheels 133 in the embodiment) and which is driven by electric power supplied from at least one of the battery and the generator, and a power transmission engaging/disengaging portion (for example, a clutch 117 in the embodiment) which is disposed between the generator and the drive wheels so as to engage or disengage a power transmission path from the internal combustion engine to the drive wheels via the generator, wherein the hybrid vehicle is driven by power from at least one of the motor and the internal combustion engine, and the control method includes the steps of:

determining whether or not the hybrid vehicle shifts from a series drive in which the motor which is driven by electric power generated by the generator based on power of the internal combustion engine is used as a drive source to an engine direct coupled drive in which at least the internal combustion engine is used as a drive source with the power transmission engaging/disengaging portion applied, deriving a rotational speed at a drive wheel side of the power transmission engaging/disengaging portion which corresponds to a driving speed of the hybrid vehicle as an applying rotational speed of the internal combustion engine at which the power transmission engaging/disengaging portion is applied, and controlling the power transmission engaging/disengaging portion so as to be applied when a difference in rotational speed between the rotational speed of the internal combustion engine and the applying rotational speed becomes equal to or smaller than a predetermined value by controlling an operation of the internal combustion engine after a shift to the engine direct coupled drive is determined.

Further, according to claim 10 of the invention, there is provided a control method of a hybrid vehicle including:

an internal combustion engine (for example, an internal combustion engine 111 in an embodiment), a generator (for example, a generator 113 in the embodiment) which is driven by the internal combustion engine to generate electric power, a battery (for example, a battery 101 in the embodiment) which supplies electric power to a motor, the motor (for example, a motor 109 in the embodiment) which is connected to drive wheels (for example, drive wheels 133 in the embodiment) and which is driven by electric power supplied from at least one of the battery and the generator, and a power transmission engaging/disengaging portion (for example, a clutch 117 in the embodiment) which is disposed between the generator and the drive wheels so as to engage or disengage a power transmission path from the internal combustion engine to the drive wheels via the generator.

wherein the hybrid vehicle is driven by power from at least one of the motor and the internal combustion engine, and the control method includes the steps of:

determining whether or not the hybrid vehicle shifts from an engine direct coupled drive in which at least the internal combustion engine is used as a drive source to a series drive in which the motor which is driven by electric power generated by the generator based on power of the internal combustion engine is used as a drive source with the power transmission engaging/disengaging portion released, changing a ratio of an electrical transmission to a mechanical transmission of an output of the internal combustion engine, and controlling the power transmission engaging/disengaging portion so as to be released when an output of the internal combustion engine through the mechanical transmission becomes equal to or smaller than a predetermined value after a shift to the series drive is determined.

Advantage of the Invention

According to the hybrid vehicle of the invention that is described in claims 1 to 8 and the control method of the hybrid vehicle of the invention that is described in claims 9 to 10, it is possible to apply or release the power transmission engaging/disengaging portion without causing a driver to have inharmonious feeling and without reduction in energy efficiency.

BRIEF DESCRIPTION OF THE DRAWINGS

FIG. 18 is a time chart showing a change in each output when the clutch 117 is released in response to a change in the state of the battery 101.

MODE FOR CARRYING OUT THE INVENTION

Hereinafter, an embodiment of the invention will be described by reference to the drawings.

An HEV (Hybrid Electric Vehicle) has a motor and an internal combustion engine, and is driven by a driving force of the motor and/or the internal combustion engine depending upon the driving condition of the HEV. The HEV is roughly classified into two types: a series HEV and a parallel HEV. The series HEV is driven by a driving force of the motor. The internal combustion engine is used only for generating electric power. Electric power generated by a generator using a driving force of the internal combustion engine is stored in a battery or is supplied to the motor.

The series HEV has two drive modes: an "EV drive mode" and a "series drive mode." In the EV drive mode, the HEV is driven by the driving force of the motor which is driven based on a power supply from the battery. As this occurs, the internal combustion engine is not driven. Additionally, in the series drive mode, the HEV is driven by the driving force of the motor which is driven based on the supply of electric power from both the battery and the motor or the supply of electric power only from the motor. As this occurs, the internal combustion engine is driven only for generation of electric power in the generator.

The parallel HEV is driven by the driving force of either or both of the motor and the internal combustion engine. In particular, the mode in which the parallel HEV is driven only by the internal combustion engine is referred to as an "engine drive mode." Additionally, the mode in which the parallel HEV is driven by the driving force from both the internal combustion engine and the motor is referred to as a "parallel drive mode."

A series/parallel HEV in which both the HEV systems are combined is also known. In this series and parallel combined HEV, a clutch is applied or released (engaged or disengaged) according to the driving condition of the HEV, whereby the transmission system of driving force is switched to either of the series system and the parallel system.

Figure 1:
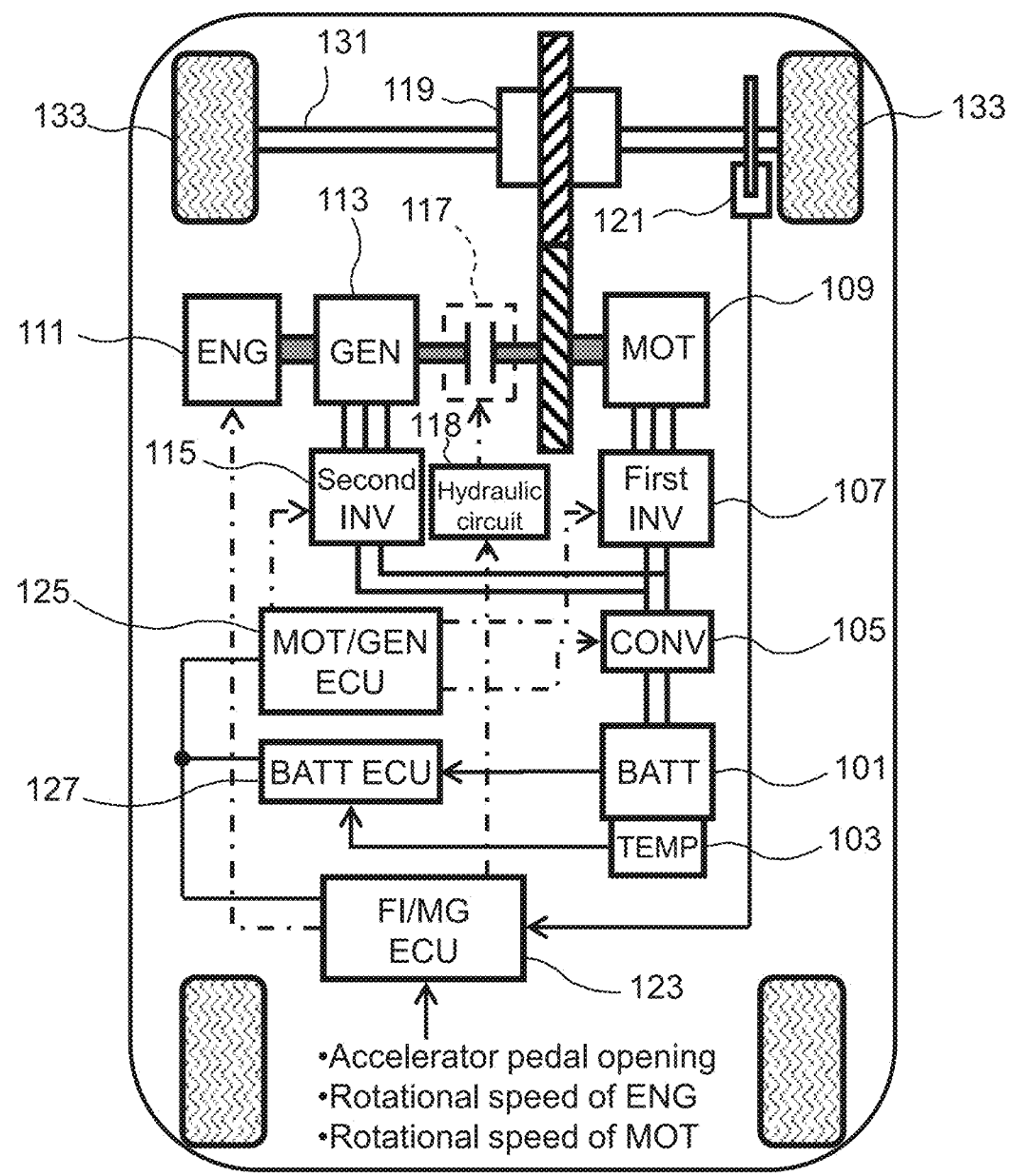
FIG. 1 is a block diagram showing an internal configuration of a series/parallel hybrid electric vehicle (HEV).

FIG. 1 is a block diagram showing an internal configuration of a series/parallel HEV. The series/parallel HEV (hereinafter, referred to as a "hybrid vehicle") shown in FIG. 1 has a battery (BATT) 101, a temperature sensor (TEMP) 103, a converter (CONV) 105, a first inverter (first INV) 107, a motor (MOT) 109, an internal combustion engine (ENG) 111, a generator (GEN) 113, a second inverter (second INV) 115, a clutch 117, a hydraulic circuit 118, a gearbox (hereinafter, referred to simply as a "gear") 119, a vehicle speed sensor 121, a management ECU (FI/MG ECU) 123, a motor ECU (MOT/GEN ECU) 125, and a battery ECU (BATT ECU) 127. Further, the hybrid vehicle includes a sensor (not shown) such as a resolver for detecting a rotational speed of the motor 109 and a sensor (not shown) such as a resolver for detecting a rotational speed of the generator 113.

The battery 101 has a plurality of battery cells which are connected in series and supplies a high voltage of 100 to 200 V, for example. The battery cells are, for example, a lithium ion battery or a nickel-metal hydride battery. The temperature sensor 103 detects a temperature of the battery 101 (hereinafter, referred to as a "battery temperature"). A signal indicating a battery temperature detected by the temperature sensor 103 is sent to the battery ECU 127.

The converter 105 increases or decreases a direct current output voltage of the battery 101 without altering the nature of the direct current. The first inverter 107 converts a direct current voltage to an alternating current voltage to supply a three-phase current to the motor 109. Additionally, the first inverter 107 converts an alternating current voltage which is inputted thereinto when the motor 109 performs a regenerative operation to a direct current to charge the battery 101.

The motor 109 generates power for driving the hybrid vehicle. Torque generated in the motor 109 is transmitted to a drive shaft 131 via the gear 119. A rotor of the motor 109 is directly coupled to the gear 119. In addition, the motor 109 operates as a generator when regenerative braking is executed, and electric power generated in the motor 109 charges the battery 101.

When the hybrid vehicle executes the series drive with the clutch 117 disengaged, the internal combustion engine 111 is used only for the generator 113. When the clutch 117 is applied, however, the output of the internal combustion engine 111 is transmitted to the drive shaft 131 via the generator 113, the clutch 117 and the gear 119 as mechanical energy for driving the hybrid vehicle. The internal combustion engine 111 is coupled directly to a rotor of the generator 113.

The generator 113 generates electric power by using power of the internal combustion engine 111. Electric power generated by the generator 113 is stored in the battery 101 or is supplied to the motor 109. The second inverter 115 converts an alternating current voltage generated in the generator 113 to a direct current voltage. Electric power converted by the second inverter 115 is stored in the battery 101 or is supplied to the motor 109 via the first inverter 107.

The clutch 117 engages or disengages a transmission path of driving force from the internal combustion engine 111 to the drive wheels 133 based on an instruction from the management ECU 123. The hydraulic circuit 118 supplies a predetermined working pressure to the clutch 117 via working oil. The gear 119 is, for example, a single-speed fixed gear which corresponds to a fifth gear. Consequently, the gear 119 converts a driving force from the internal combustion engine 111 via the generator 113 or a driving force from the motor 109 to a rotational speed and torque at a specific gear ratio and transmits it to the drive shaft 131. The vehicle speed sensor 121 detects a driving speed (a vehicle speed) of the hybrid vehicle. A signal indicating the vehicle speed detected by the vehicle speed sensor 121 is sent to the management ECU 123.

The management ECU 123 calculates a required driving force based on an accelerator pedal opening (AP opening) which corresponds to an accelerator pedal operation by a driver of the hybrid vehicle and a vehicle speed, switches transmission systems of driving force, controls the engagement/disengagement of the clutch 117 by using the hydraulic circuit 118, and controls the operation of the internal combustion engine 111. The controls performed by the management ECU 123 are indicated by alternate long and short dash lines in FIG. 1. The details of the management ECU 123 will be described later.

The motor ECU 125 controls the switching of switching elements which make up individually the converter 105, the first inverter 107, and the second inverter 115 to thereby control the operation of the motor 109 or the generator 113. The controls of the converter 105, the first inverter 107 and the second inverter 115 by the motor ECU 125 are indicated by alternate long and short dash lines in FIG. 1.

The battery ECU 127 derives a remaining capacity (SOC: State Of Charge) of the battery 101 based on information on the battery temperature obtained from the temperature sensor 103, as well as information on a chargeable or dischargeable current and a terminal voltage of the battery 101 and the like.

(Configuration of Hydraulic Circuit 118)

Figure 2:
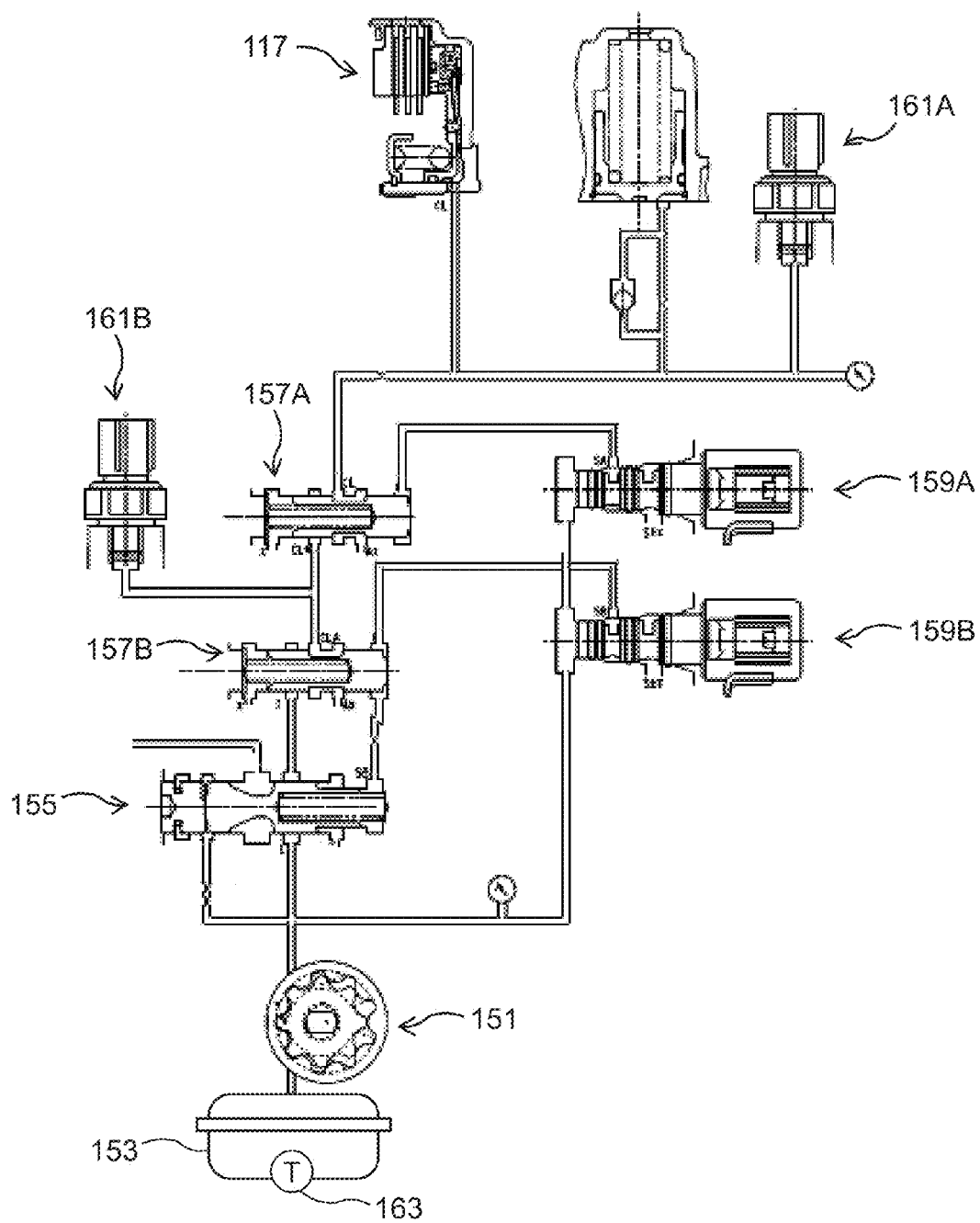
FIG. 2 is a diagram showing an internal configuration of a hydraulic circuit 118 and a relation between the hydraulic circuit 118 and a clutch 117.

FIG. 2 is a diagram showing an internal configuration of the hydraulic circuit 118 and a relation between the hydraulic circuit 118 and the clutch 117. As shown in FIG. 2, the hydraulic circuit 118 supplies a working oil which is discharged from an oil tank 153 by an oil pump 151 to the clutch 117 by way of a regulator valve 155 and two shift valves 157A, 157B. The shift valves 157A, 157B are provided along a pump oil path extending from the regulator valve 155 to the clutch 117. The shift valve 157A is provided on a downstream side of the pump oil path and the shift valve 157B is provided an upstream side thereof. The hydraulic circuit 118 includes a hydraulic switch 161A which detects the opening or closing of the shift valve 157A and a hydraulic switch 161B which detects the opening or closing of the shift valve 157B.

The shift valve 157A is opened and closed by a shift solenoid 159A, and the shift valve 157B is opened and closed by a shift solenoid 159B. The shift solenoids 159A, 159B are controlled individually with respect to energization by the management ECU 123. When shift solenoids are energized, shift valves are opened, and the shift valves are closed by stopping the energization of the shift solenoids. Consequently, when the shift solenoids 159A, 159B are energized, the shift valves 157A, 157B are opened, whereby the clutch 117 is applied by means of a pressure applied by the working oil.

Figure 3:
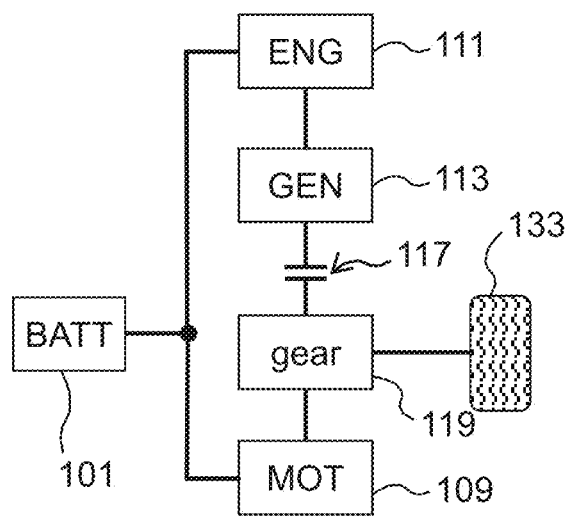
FIG. 3 is a schematic diagram of a main part of a driving system of the hybrid vehicle shown in FIG. 1.
Figure 4:
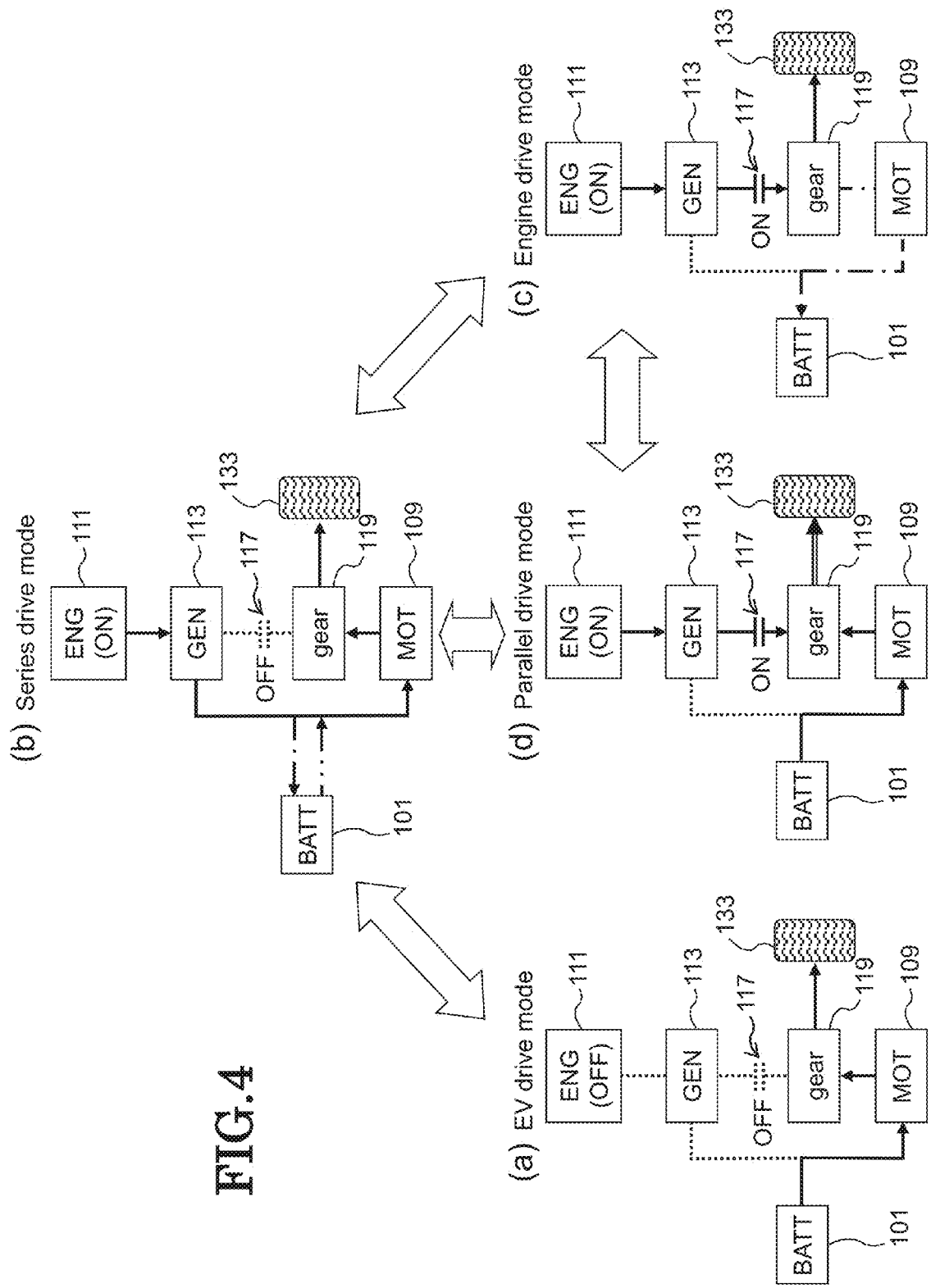
FIG. 4 shows driving states of various drive modes of the hybrid vehicle, in which an EV drive mode is shown at (a), a series drive mode is shown at (b), an engine drive mode is shown at (c), and a parallel drive mode is shown at (d).

FIG. 3 is a schematic diagram of a main part of the driving system of the hybrid vehicle shown in FIG. 1. FIG. 4 shows driving states of various drive modes and transitions between the drive modes of the hybrid vehicle, in which an EV drive mode is shown at (a), a series drive mode is shown at (b), an engine drive mode is shown at (c), and a parallel drive mode is shown at (d).

In the hybrid vehicle which is driven in the EV drive mode, as shown at (a) in FIG. 4, the clutch 117 is released, and the internal combustion engine 111 is stopped. The hybrid vehicle is driven by the driving force of the motor 109 which is driven by a power supply from the battery 101.

In the hybrid vehicle which is driven in the series drive mode, as shown at (b) in FIG. 4, the clutch 117 is released, and the internal combustion engine 111 is operated to supply electric power which is good enough to allow the motor 109 to output a required driving force based on the AP opening and the vehicle speed. The hybrid vehicle is driven by the driving force of the motor 109 which is driven by electric power supplied from the generator 113. It is noted that in the hybrid vehicle which is driven in the series drive mode, the internal combustion engine 111 may be driven at an operation point on the BSFC bottom line to thereby store a residual portion of electric power generated in the battery 101 as indicated by an alternate long and short dash line at (b) in FIG. 4. In addition, in the event that the electric power obtained by driving the internal combustion engine 111 at the operation point on the BSFC bottom line is not good enough to meet the required driving force, in addition to the electric power supplied from the generator 113, assisting electric power may be supplied from the battery 101 to the motor 109 as indicated by a chain double-dashed line at (b) in FIG. 4.

In the hybrid vehicle which is driven in the engine drive mode, as shown at (c) in FIG. 4, the clutch 117 is applied, and the hybrid vehicle is driven by the driving force of the internal combustion engine 111. While the hybrid vehicle is driven in the engine drive mode, the rotor of the motor 109 and the rotor of the generator 113 are entrained to rotate in association with the driving of the internal combustion engine 111. However, the motor ECU 125 performs a zero current control so that an unloaded condition is present in the generator 113. It is noted that in the hybrid vehicle which is driven in the engine drive mode, the internal combustion engine 111 may be operated at an operation point on the BSFC bottom line so that electric power generated in the motor 109 driven as a generator is stored in the battery as indicated by an alternate long and short dash line at (c) in FIG. 4.

In the hybrid vehicle which is driven in the parallel drive mode, as shown at (d) in FIG. 4, the clutch 117 is applied, and the hybrid vehicle is driven by the driving force of both the internal combustion engine 111 and the motor 109. While the hybrid vehicle is driven in the parallel drive mode, the rotor of the generator 113 is entrained to rotate in association with the driving of the internal combustion engine 111. However, the second inverter 115 performs a zero current control so that an unloaded condition is present in the generator 113.

When the hybrid vehicle is accelerated at low to medium speeds, the drive mode of the hybrid vehicle is set to the EV drive mode or the series drive mode with the clutch 117 released. In addition, when the hybrid vehicle is driven constant at medium to high speeds (cruise drive), the drive mode of the hybrid vehicle is set to the engine drive mode with the clutch 117 applied. Then, when the hybrid vehicle is accelerated at medium to high speeds, the drive mode of the hybrid vehicle is set to the parallel drive mode. The setting of the drive mode is executed by the management ECU 123 shown in FIG. 1 after the ECU makes a determination on a driving phase based on the accelerator pedal opening (AP opening) and the vehicle speed. For example, when the driving phase changes from the "low to medium speed acceleration drive" to the "medium to high speed acceleration drive," the management ECU 123 applies the clutch 117 so as to switch the drive mode from the "series drive mode" to the "engine drive mode."

Figure 5:
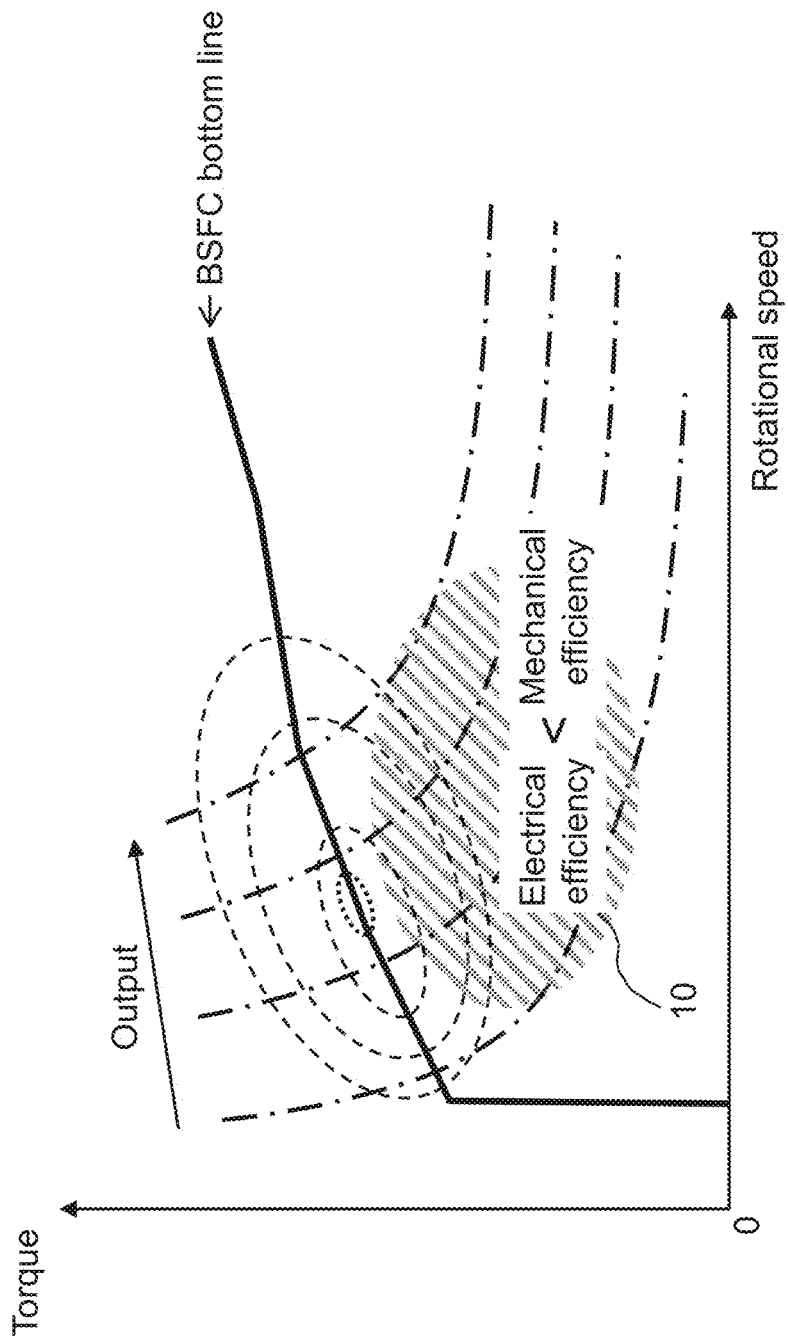
FIG. 5 is a graph showing a characteristic in relation to a thermal efficiency of an internal combustion engine 111.

FIG. 5 is a graph showing a characteristic of the internal combustion engine 111 in relation to thermal efficiency. In the graph, an axis of ordinates represents the torque of the internal combustion engine 111, while an axis of abscissas represents the rotational speed of the internal combustion engine 111. A thick solid line in FIG. 5 is a line which connects operation points of the internal combustion engine 111 where a least fuel consumption rate is obtained (the BSFC bottom line). Alternate long and short dash lines in FIG. 5 are lines which connect operation points of the internal combustion engine 111 where the same output is obtained although the torque and rotational speed differ (equioutput lines). Ovals defined by broken lines in FIG. 5 are lines which connect operation points of the internal combustion engine 111 where the output efficiency of the internal combustion engine 111 become identical (equiefficiency lines). Inner equiefficiency lines represent higher output efficiencies. It is noted that an operation point on the BSFC bottom line which resides within an area surrounded by an innermost equiefficiency line in FIG. 5 is referred to as a "most efficient operation points." An output of the internal combustion engine 111 operated at the most efficient operation point is referred to as a "most efficient output."

As described above, output energy from the internal combustion engine 111 is mechanical energy. However, mechanical energy outputted by the internal combustion engine 111 when the clutch 117 is released is converted to electrical energy by the generator 113 and is thereafter consumed to drive the hybrid vehicle. Energy transmission efficiency then is referred to as "electrical efficiency" and a form of transmission is referred to as "electrical transmission." On the other hand, mechanical energy outputted by the internal combustion engine 111 when the clutch 117 is applied is consumed as it is to drive the hybrid vehicle via the generator 113 and the gear 119. Energy transmission efficiency then is referred to "mechanical efficiency" and a form of transmission is referred to as "mechanical transmission." An area 10 shaded with oblique lines in FIG. 5 is an area where the mechanical transmission is better than the electrical transmission as the transmission efficiency of the output energy of the internal combustion engine 111.

Hereinafter, a control performed by the management ECU 123 when the hybrid vehicle of the embodiment which is driven in the series drive mode is shifted to the engine drive mode or the parallel drive mode with the clutch 117 applied will be described by reference to Examples 1 and 2. It is noted that in the following description, the engine drive mode or the parallel drive mode will be referred to as an "engine direct coupled drive."

Figure 6:
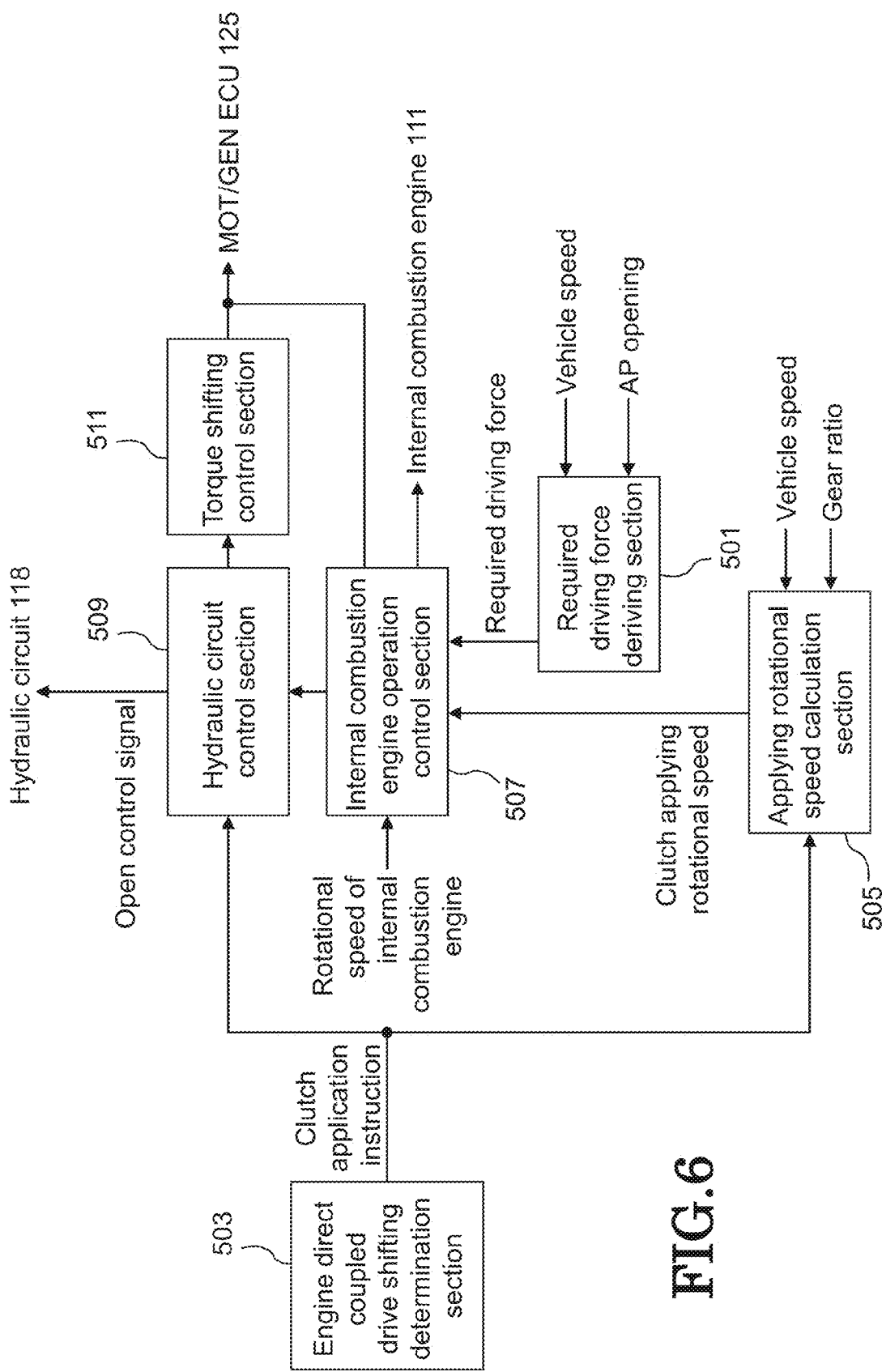
FIG. 6 is a block diagram showing an internal configuration of a management ECU 123 which controls a sift from a series drive mode to an engine direct coupled drive.

Respective controls described in Examples 1 and 2 below are performed by the management ECU 123. FIG. 6 is a block diagram of the management ECU 123 which controls a shift from the series drive mode to the engine direct coupled drive. As shown in FIG. 6, the management ECU 123 has a required driving force deriving section 501, an engine direct coupled drive shifting determination section 503, an applying rotational speed calculation section 505, an internal combustion engine operation control section 507, a hydraulic circuit control section 509, and a torque shifting control section 511.

The required driving force deriving section 501 derives a required driving force required on the hybrid vehicle based on the AP opening and the vehicle speed. It is noted that torque on the drive shaft 131 obtained from the required driving force and the vehicle speed is referred to as "axle torque." The engine direct coupled drive shifting determination section 503 determines whether or not to shift the drive mode of the hybrid vehicle which is driven in the series drive mode to the engine direct coupled drive with the clutch 117 applied based on energy efficiency that is estimated when the shift to the engine direct coupled drive is made.

The applying rotational speed calculation section 505 calculates an applying rotational speed (a clutch applying rotational speed) of the internal combustion engine 111 at which the clutch 117 is applied without any shock. In calculating a clutch applying rotational speed, the applying rotational speed calculation section 505 calculates a rotational speed of the drive shaft 131 based on the vehicle speed and the radius of the drive wheel 133. A rotational speed at an output side of the clutch 117 which will result when the clutch 117 is applied is calculated from the rotational speed of the drive shaft 131 and a gear ratio of the gear 119. With the clutch 117 applied, the internal combustion engine 111 is connected to the clutch 117 via a rotor of the generator 113, and therefore, the rotational speed calculated is a "clutch applying rotational speed."

When the engine direct coupled drive shifting determination section 503 determines the shift to the engine direct coupled drive, the internal combustion engine operation control section 507 controls the torque of the generator 113 to perform a matching of rotational speed of the internal combustion engine 111 before the application of the clutch 117 so that the rotational speed of the internal combustion engine 111 comes close to the clutch applying rotational speed.

The hydraulic circuit control section 509 outputs an open control signal to open the shift valve 157B of the hydraulic circuit 118 when the engine direct coupled drive shifting determination section 503 determines the shift to the engine direct coupled drive. This open control signal is sent to the shift solenoid 159B of the hydraulic circuit 118. The shift solenoid 159B is energized by the open control signal to open the shift valve 157B. Further, the hydraulic circuit control section 509 outputs an open control signal to open the shift valve 157A of the hydraulic circuit 118 when a difference in rotational speed between the rotational speed of the internal combustion engine 111 and the clutch applying rotational speed becomes equal to or smaller than a predetermined value. This open control signal is sent to the shift solenoid 159A of the hydraulic circuit 118. The shift solenoid 159A is energized by the open control signal to open the shift valve 157A. It is noted that the hydraulic circuit control section 509 starts counting a predetermined period of time from a point in time when it outputs the open control signal to open the shift valve 157A.

The torque shifting control section 511 determines that the application of the clutch 117 is completed due to a working pressure that is applied from the hydraulic circuit 118 to the clutch 117 being raised sufficiently when the hydraulic circuit control section 509 completes the counting of the predetermined period of time. Having determined that the application of the clutch 117 is completed, the torque shifting control section 511 controls the torque of both the motor 109 and the generator 113 to change gradually the torque distribution to the drive shaft 131 of the hybrid vehicle from the motor 109 to the internal combustion engine 111. It is noted that in this embodiment, the internal combustion engine operation control section 507 controls so that the torque of the internal combustion engine 111 becomes constant while the torque shifting control is carried out by the torque shifting control section 511.

EXAMPLE 1

Figure 7:
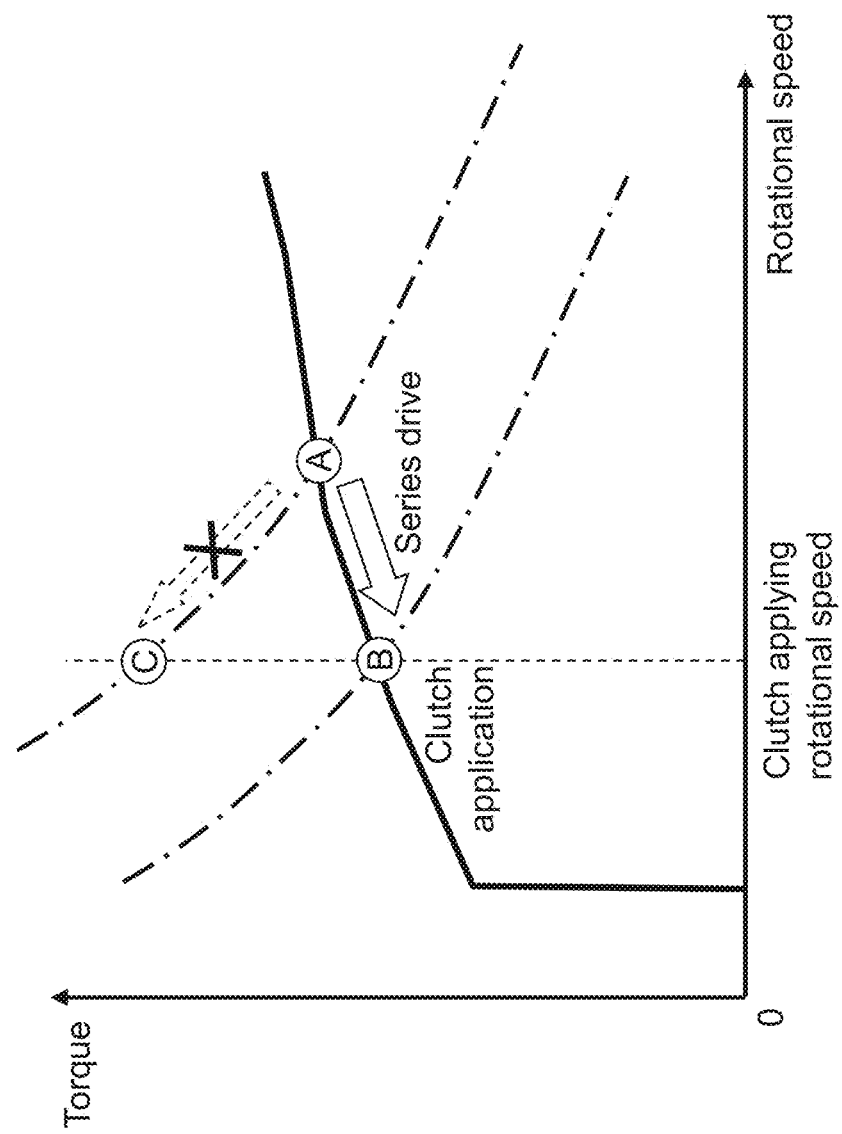
FIG. 7 is a graph showing a transition of an operation point of the internal combustion engine 111 in shifting to the engine direct coupled drive when a rotational speed of the internal combustion engine 111 resulting in the series drive mode is higher than a rotational speed thereof at which the clutch 117 is applied.

FIG. 7 is a graph showing a transition of the operation point of the internal combustion engine 111 in shifting to the engine direct coupled drive when a rotational speed of the internal combustion engine 111 resulting when in the series drive mode is higher than the rotational speed thereof at which the clutch 117 is applied. An operation point A shown in FIG. 7 is an operation point of the internal combustion engine 111 when the hybrid vehicle is cruising or is being accelerated moderately in the series drive mode by a driving force supplied from the motor 109 according to an accelerator pedal operation by the driver. In dropping the rotational speed of the internal combustion engine 111 to a value indicated by a broken line in FIG. 7 (a clutch applying rotational speed) at which the clutch 117 is applied without any shock from the state described above, when the output at the output side of the clutch 117 is caused to coincide with the output of the motor 109 while following the required driving force, the operation point of the internal combustion engine 111 shifts from A to C along an equioutput line indicated by an alternate long and short dash line. As this occurs, the operation point deviates from the BSFC bottom line, and therefore, the fuel consumption rate is deteriorated.

In this example, the internal combustion engine operation section 507 of the management ECU 123 controls the torque of the generator 113 to thereby lower the rotational speed of the internal combustion engine 111 continuously. When a difference in rotational speed between the rotational speed of the internal combustion engine 111 and the clutch applying rotational speed becomes equal to or smaller than a predetermined value, the hydraulic circuit control section 509 of the management ECU 123 opens the shift valve 157A of the hydraulic circuit 118 and controls so that the working oil is supplied from the hydraulic circuit 118 to the clutch 117. As this occurs, even though the clutch 117 is applied, no shock is produced, and the fuel consumption rate of the internal combustion engine 111 is kept in a good condition. In this example, when the rotational speed of the internal combustion engine 111 is lowered to the clutch applying rotational speed, as shown in FIG. 7, the internal combustion engine operation control section 507 controls the operation of the internal combustion engine so that the operation point of the internal combustion engine 111 shifts from A to B along the BSFC bottom line.

EXAMPLE 2

Figure 8:
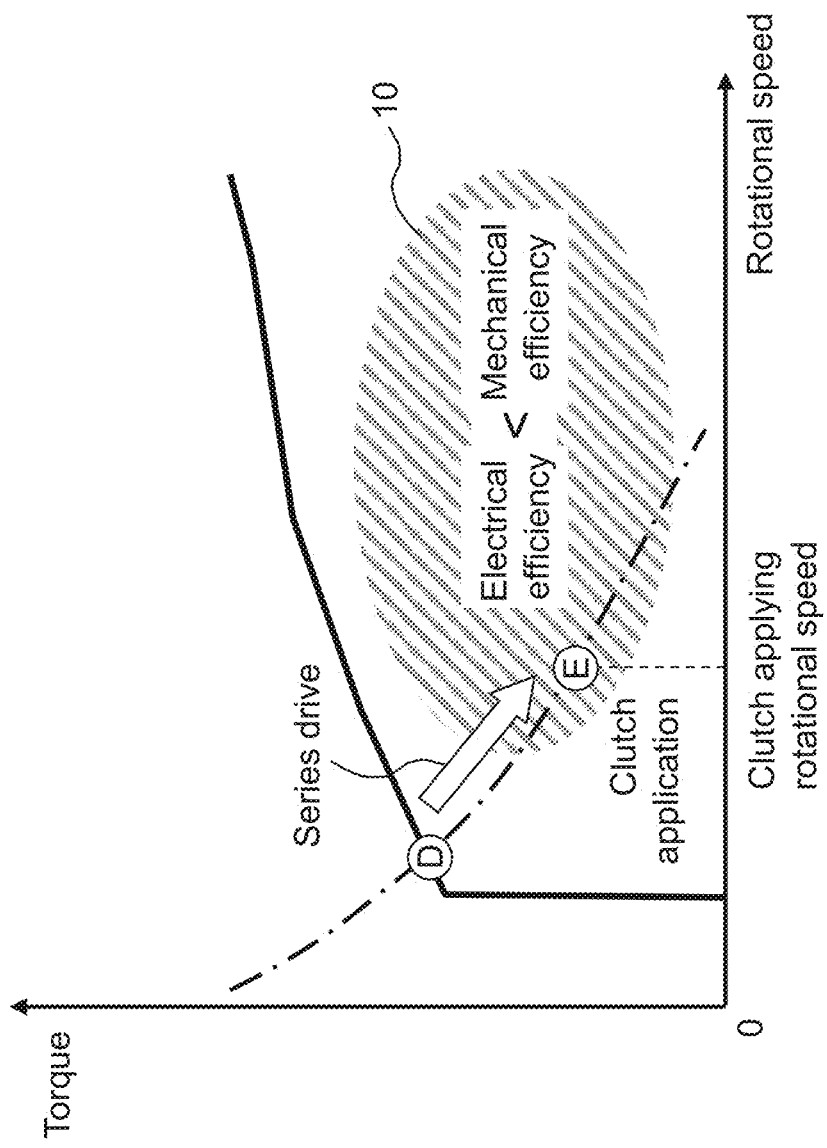
FIG. 8 is a graph showing a transition of an operation point of the internal combustion engine 111 in shifting to the engine direct coupled drive when the rotational speed of the internal combustion engine 111 resulting in the series drive mode is lower than the rotational speed thereof at which the clutch 117 is applied.

FIG. 8 is a graph showing a transition of the operation point of the internal combustion engine 111 in shifting to the engine direct coupled drive when the rotational speed of the internal combustion engine 111 resulting when in the series drive mode is lower than the rotational speed thereof at which the clutch 117 is applied. An operation point D shown in FIG. 8 is an operation point of the internal combustion engine 111 when the hybrid vehicle is being decelerated in the series drive mode by a driving force supplied from the motor 109 according to an accelerator pedal operation by the driver. In this example, the internal combustion engine operation control section 507 of the management ECU 123 controls the torque of the generator 113 to raise the rotational speed of the internal combustion engine 111 to a value indicated by a broken line in FIG. 8 (a clutch applying rotational speed) at which the clutch 117 is applied without any shock. A difference in rotational speed between the rotational speed of the internal combustion engine 111 and the clutch applying rotational speed becomes equal to or smaller than a predetermined value, the hydraulic circuit control section 509 of the management ECU 123 opens the shift valve 157A of the hydraulic circuit 118 and controls so that the working oil is supplied from the hydraulic circuit 118 to the clutch 117. In this example, when the rotational speed of the internal combustion engine is raised to the clutch applying rotational speed, in the event that the required driving force is constant, the internal combustion engine operation section 507 controls the operation of the internal combustion engine 111 so that the operation point of the internal combustion engine 111 shifts from D to E along the equioutput line as shown in FIG. 8. Namely, the internal combustion engine operation section 507 controls so that the internal combustion engine 111 maintains the output corresponding to the required driving force while the operation point shifts in the way described above.

When the operation point shifts from D to E, the operation point of the internal combustion engine 111 deviates from the BSFC bottom line, and therefore, the fuel consumption rate is deteriorated. However, being different from Example 1, the load (torque) of the internal combustion engine 111 shifts to descend, and the operation point E resides within an area 10 where the mechanical efficiency is better than the electrical efficiency. Because of this, no shock is produced when the clutch 117 is applied, and an energy efficiency (=fuel consumption rate×electrical efficiency) is obtained which is better than a total energy efficiency which would result in case the hybrid vehicle is kept being driven in the series drive mode.

Figure 9:
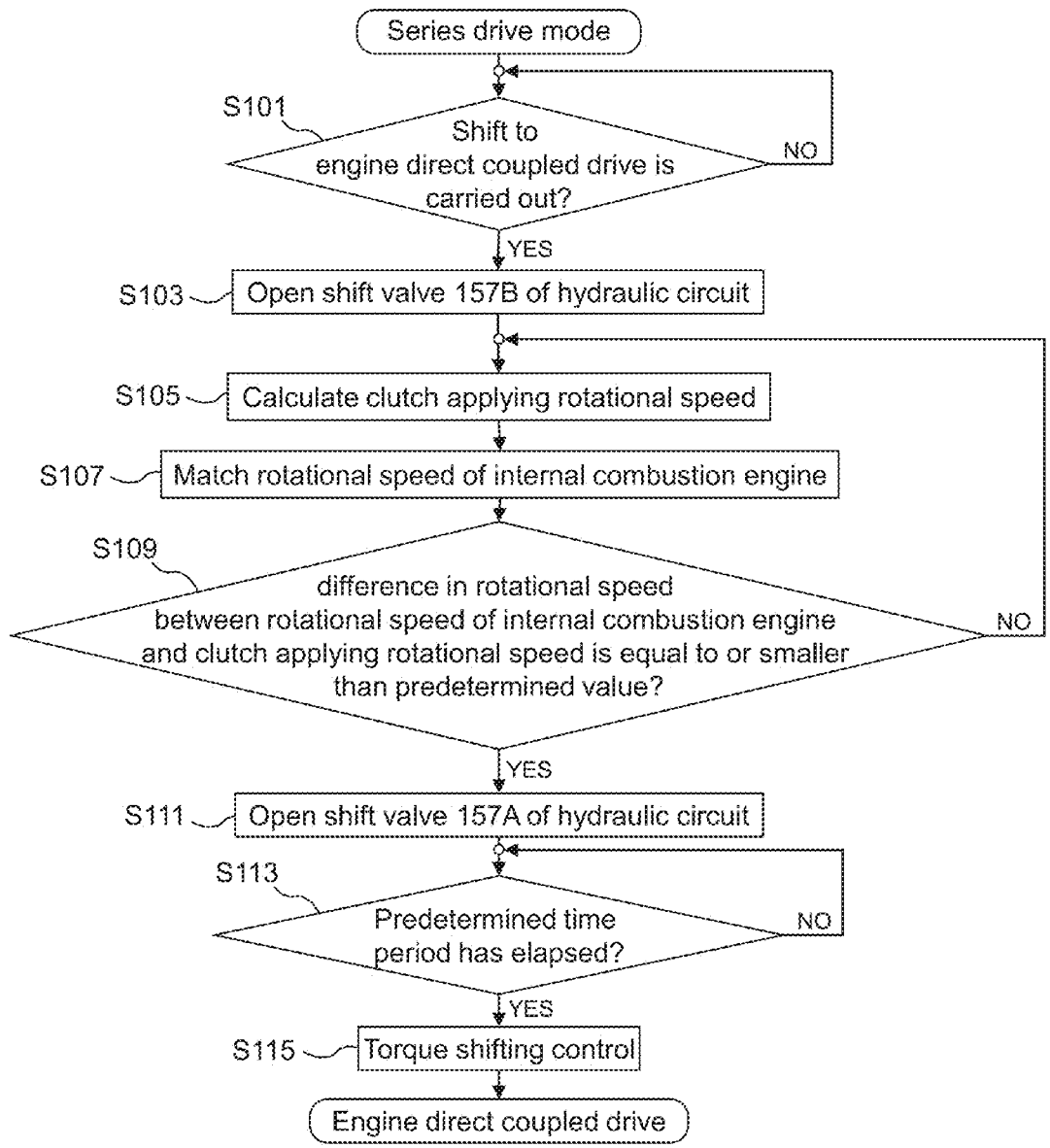
FIG. 9 is a flowchart showing the operation of the management ECU 123 when a shift from the series drive mode to the engine direct coupled drive is made.

Hereinafter, the operation of the management ECU 123 will be described by reference to FIG. 9 which includes the control of the internal combustion engine 111 and the application of the clutch 117 in shifting the drive mode from the series drive mode to the engine direct coupled drive. FIG. 9 is a flowchart illustrating operations performed by the management ECU 123 when the drive mode of the hybrid vehicle shifts from the series drive mode to the engine direct coupled drive. With the hybrid vehicle driven in the series drive mode, as shown in FIG. 9, when the engine direct coupled drive shifting determination section 503 of the management ECU 123 determines the shift to the engine direct coupled drive, the hydraulic circuit control section 509 opens the shift valve 157B of the hydraulic circuit 118 (step S103). Next, the applying rotational speed calculation section 505 calculates a clutch applying rotational speed (step S105). Next, the internal combustion engine operation control section 507 controls the torque of the generator 113 to execute a rotational speed matching of the internal combustion engine 111 (step S107).

Next, when a difference in rotational speed between the rotational speed of the internal combustion engine 111 and the clutch applying rotational speed becomes equal to or smaller than a predetermined value, the hydraulic circuit control section 509 opens the shift valve 157A of the hydraulic circuit 118 (step S111). When the difference in rotational speed exceeds the predetermined value, the flowchart returns to step S105. When a predetermined period of time elapses since the operation performed in step S111, determining that the application of the clutch 117 is completed, the torque shifting control section 511 controls the torque to be supplied to the drive shaft 131 of the hybrid vehicle so as to be shifted more from the internal combustion engine 111 than from the motor 109 (step S115).

Figure 10:
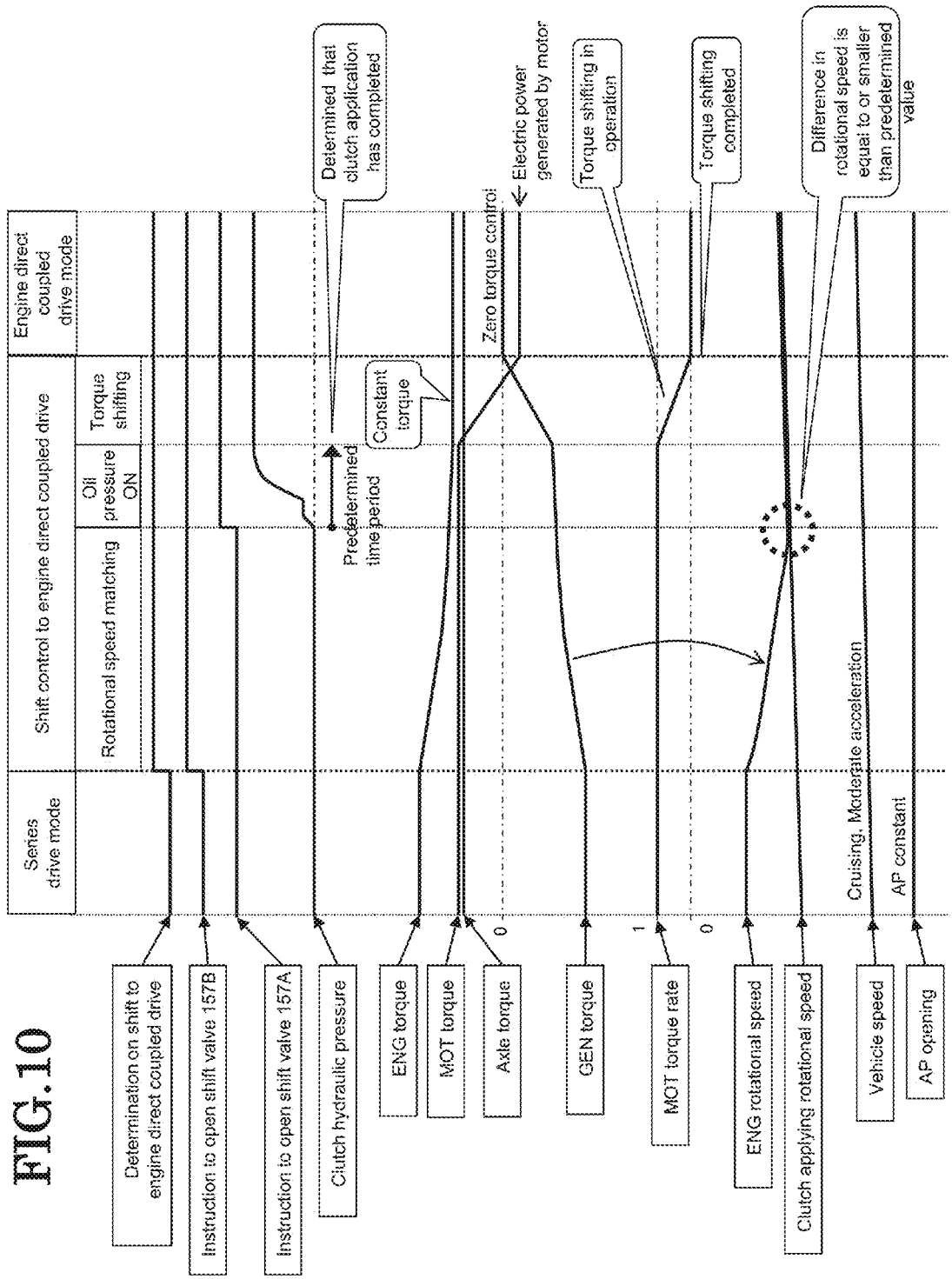
FIG. 10 shows an example of a timing chart resulting when a shift to the engine direct coupled drive is made while a moderate acceleration is executed in the series drive mode when the rotational speed of the internal combustion engine 111 resulting in the series drive mode is higher than the rotational speed thereof at which the clutch 117 is applied.
Figure 11:
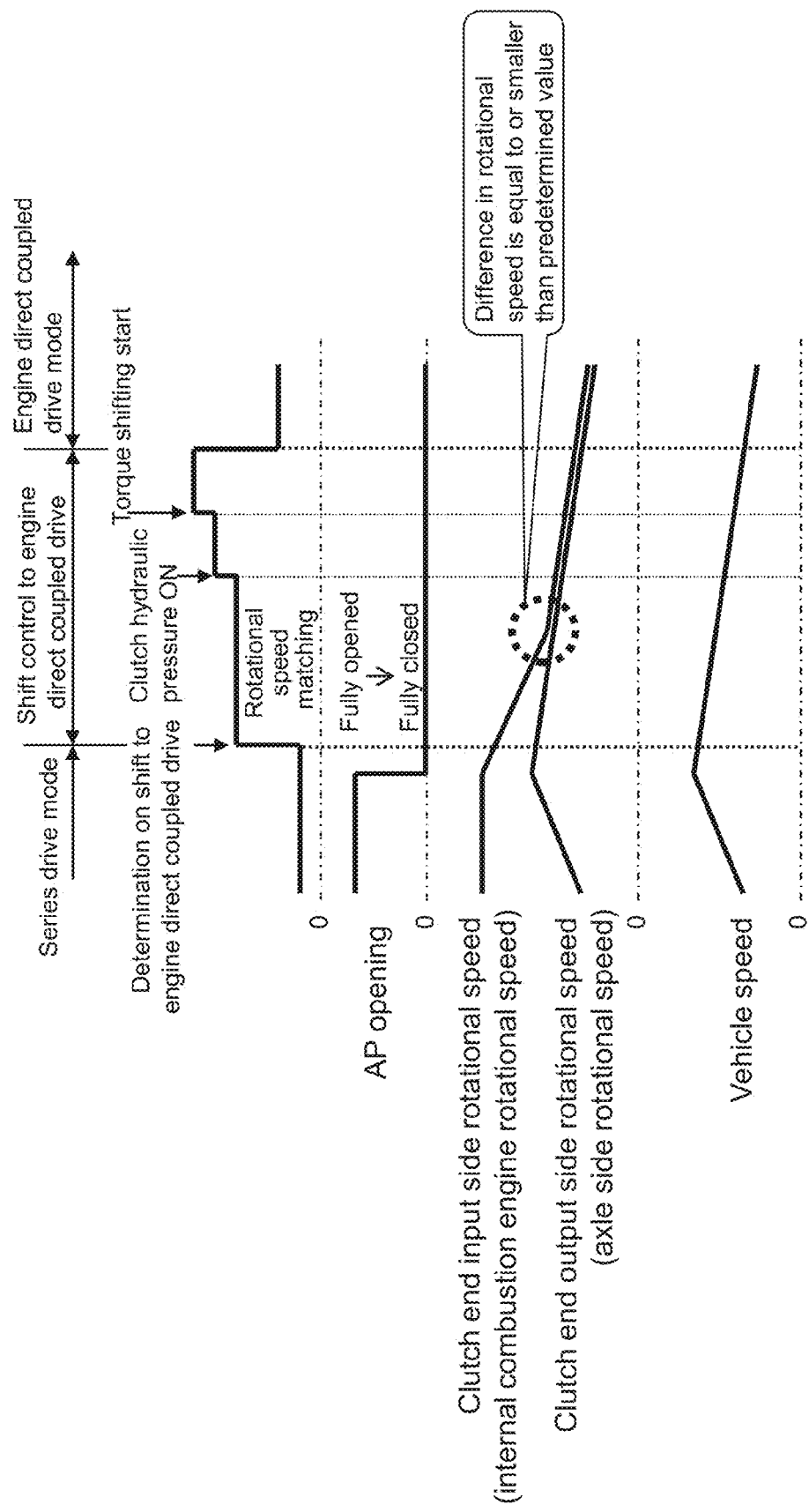
FIG. 11 shows an example of a timing chart resulting when a shift to the engine direct coupled drive is made while a deceleration is executed in the series drive mode when the rotational speed of the internal combustion engine 111 resulting in the series drive mode is higher than the rotational speed thereof at which the clutch 117 is applied.

FIG. 10 shows an example of a timing chart resulting when a shift to the engine direct coupled drive is made while a moderate acceleration is executed in the series drive mode when the rotational speed of the internal combustion engine 111 resulting in the series drive mode is higher than the rotational speed thereof at which the clutch 117 is applied. In addition, FIG. 11 shows an example of a timing chart resulting when a shift to the engine direct coupled drive is made while a deceleration is executed in the series drive mode when the rotational speed of the internal combustion engine 111 resulting in the series drive mode is higher than the rotational speed thereof at which the clutch 117 is applied.

As has been described heretofore, in the event that the controls of the management ECU 123 that have been described above are executed in the hybrid vehicle of this embodiment, when the drive mode is shifted from the series drive mode to the engine direct coupled drive, the clutch can be applied without any shock and with no reduction in efficiency (the fuel consumption rate or the total efficiency) involved.

Next, controls performed by the management ECU 123 when the hybrid vehicle which is driven in the engine direct coupled drive is shifted to the series drive mode with the clutch 117 released will be described by reference to Examples 3 and 4.

Figure 12:
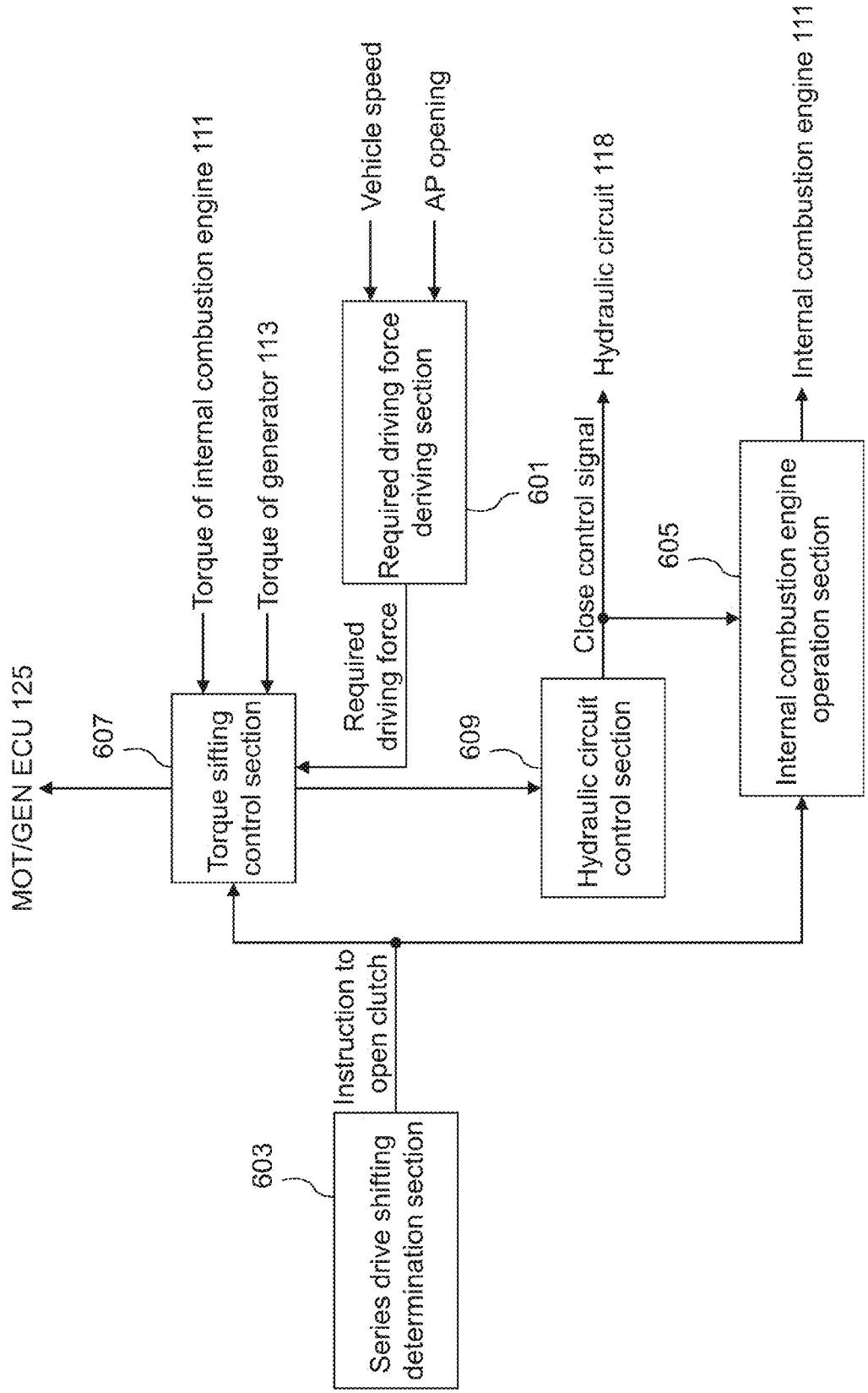
FIG. 12 is a block diagram showing an internal configuration of the management ECU 123 which controls a shift from the engine direct coupled drive to the series drive mode.

Respective controls of Examples 3 and 4, which will be described below, are performed by the management ECU 123. FIG. 12 is a block diagram showing an internal configuration of the management ECU 123 which controls a shift from the engine direct coupled mode to the series drive mode. As shown in FIG. 12, the management ECU 123 has a required driving force deriving section 601, a series drive shifting determination section 603, an internal combustion engine operation control section 605, a torque shifting control section 607, and a hydraulic circuit control section 609.

The required driving force deriving section 601 derives a required driving force required on the hybrid vehicle based on the AP opening and the vehicle speed. Torque on the drive shaft 131 obtained from the required driving force and the vehicle speed is referred to as "axle torque." The series drive shifting determination section 603 determines whether or not the drive mode of the hybrid vehicle is shifted to the series drive mode with the clutch 117 released based on energy efficiency assumed to result when the drive mode of the hybrid vehicle which is driven in the engine direct coupled drive mode is shifted to the series drive mode.

When the shift to the series drive mode is determined by the series drive shifting determination section 603, the internal combustion engine operation control section 605 controls so that the torque of the internal combustion engine 111 is maintained constant by controlling the torque of the generator 113 until the clutch 117 is applied completely.

When the shift to the series drive mode is determined by the series drive shifting determination section 603, the torque shifting control section 607 controls the torque of both the motor 109 and the generator 113 so as to shift gradually the distribution of torque to the drive shaft 131 of the hybrid vehicle from the internal combustion engine 111 to the motor 109. Namely, the torque shifting control section 607 increases the torque of the generator 113 continuously, whereby the generator 113 gradually absorbs the torque of the internal combustion engine 111 which is maintained constant. At the same time, the torque shifting control section 607 increases the torque of the motor 109 continuously, whereby the motor 109 outputs torque corresponding to the required driving force. It is noted that when a difference between the axle torque corresponding to the required driving force and the torque of the motor 109 becomes equal to or smaller than a predetermined value, the torque shifting control section 607 determines that the torque shifting control is completed. It is also noted that in the event that a difference between the torque of the internal combustion engine 111 which is maintained constant and the torque of the generator 113 is equal to or smaller than a predetermined value, the torque shifting control section 607 determines that a mechanical transmission output of the internal combustion engine 111 which is transmitted to the drive shaft 131 becomes equal to or smaller than a predetermined value and makes a determination that the torque shifting is completed.

When the shift of torque is completed after the shift to the series drive mode is determined by the series drive shifting determination section 603, the hydraulic circuit control section 609 outputs a close control signal which signals the closure of the shift valve 157A of the hydraulic circuit 118. This close control signal is sent to the shift solenoid 159A of the hydraulic circuit 118. The energization of the shift solenoid 159A is stopped by the close control signal, and the shift valve 157A is closed. It is noted that the hydraulic circuit control section 609 starts counting a predetermined period of time since a point in time when the close control signal signaling the closure of the shift valve 157A is outputted. Further, when it completes the counting of the predetermined period of time, the hydraulic circuit control section 609 output a close control signal signaling the closure of the shift valve 157B of the hydraulic circuit 118. This close control signal is sent to the shift solenoid 159B of the hydraulic circuit 118. The energization of the shift solenoid 159B is stopped by the close control signal, and the shift valve 157B is closed. When the hydraulic circuit control section 609 closes the shift valve 157B, the management ECU 123 determines that the release of the clutch 117 is completed.

Thus, as has been described heretofore, the internal combustion engine operation control section 605 controls so that the torque of the internal combustion engine 111 is maintained constant by controlling the torque of the generator 113 for a duration of time from the determination of the shift to the series drive mode until the complete release of the clutch 117, that is, for a transition period from the engine direct coupled drive to the series drive mode. After the clutch 117 is completely released, the internal combustion engine operation control section 605 promotes an increase in output of the internal combustion engine 111 by lowering the torque of the generator 113. As a result, the torque and rotational speed of the internal combustion engine 111 are raised together.

Figure 13:
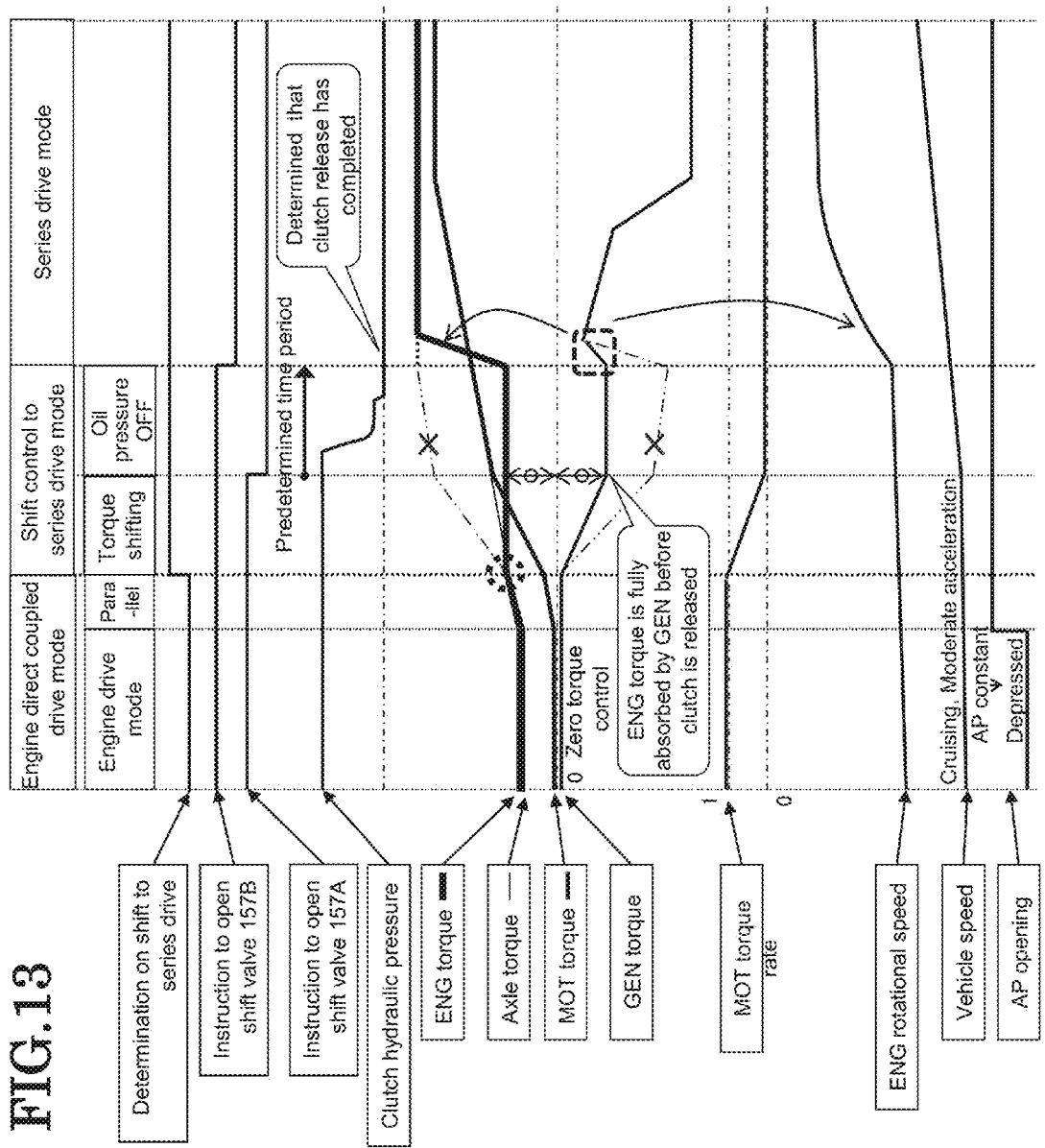
FIG. 13 is an example of a timing chart when a shift to the series drive mode is executed while the hybrid vehicle is being accelerated moderately in the engine direct coupled drive.

FIG. 13 is an example of a timing chart when a shift to the series drive mode is executed while the hybrid vehicle is being accelerated moderately in the engine direct coupled drive. In the timing chart shown in FIG. 13, a change in torque of the internal combustion engine 111 when the torque of the internal combustion engine 111 is not maintained constant during the transition period to the series drive mode is indicated by a chain double-dashed line. As shown in FIG. 13, too, because the torque of the internal combustion engine 111 is maintained constant during the transition period to the series drive mode, even though the torque is shifted by the torque shifting control section 607 or the clutch 117 is released by the hydraulic circuit control section 609, the shift is executed in a stable fashion without intended vibration or the like.

Figure 14:
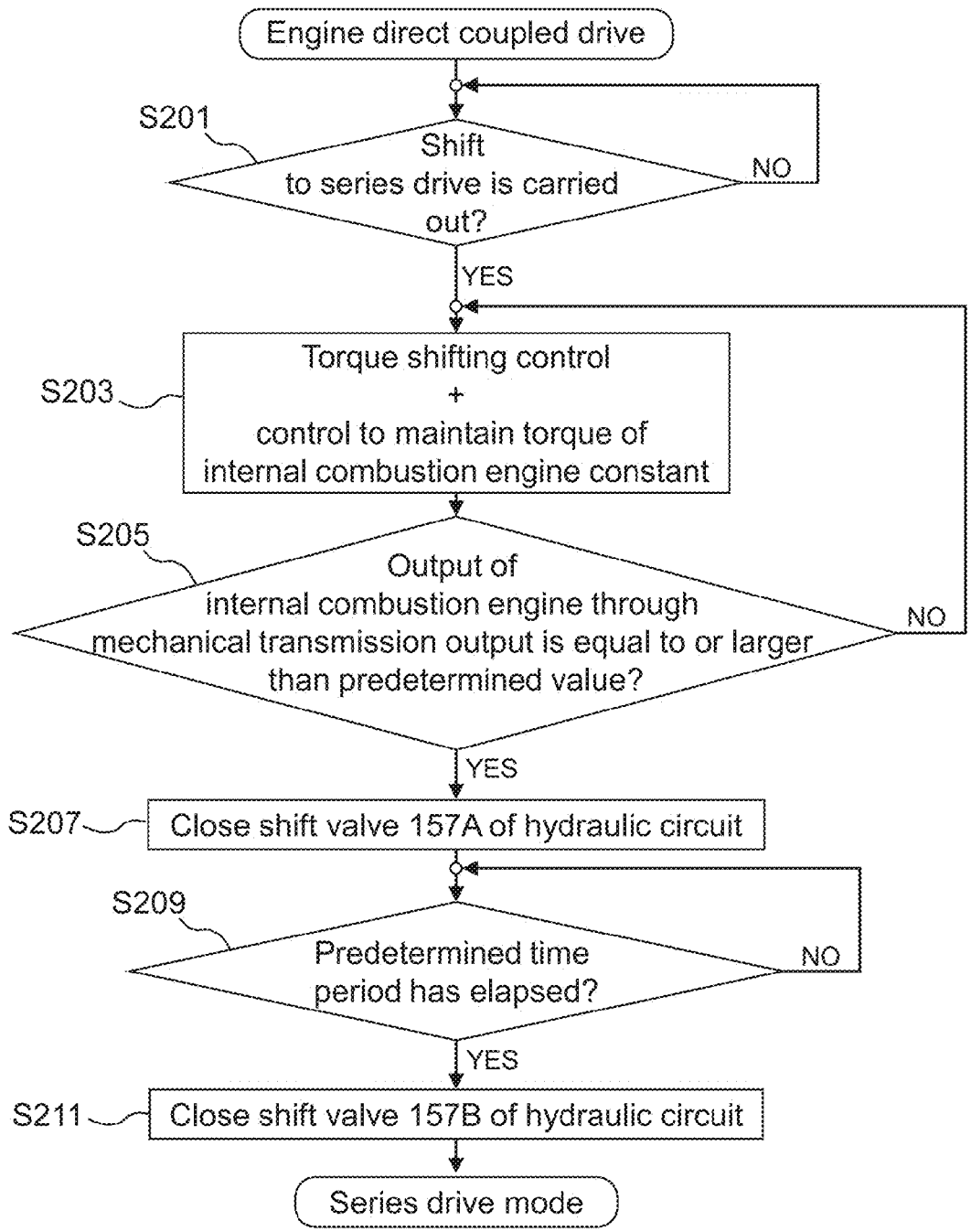
FIG. 14 is a flowchart showing the operation of the management ECU 123 when a shift from the engine direct coupled drive to the series drive mode.

Hereinafter, the operation of the management ECU 123 will be described by reference to FIG. 14 which includes the control of the internal combustion engine 111 and the release of the clutch 117 which are associated with the shift from the engine direct coupled drive to the series drive mode. FIG. 14 is a flowchart illustrating operations of the management ECU 123 which are performed when the shift is made from the engine direct coupled drive to the series drive mode. With the hybrid vehicle driven in the engine direct coupled drive mode, as shown in FIG. 14, when the series drive shifting determination section 603 of the management ECU 123 determines on a shift to the series drive mode, the torque shifting control section 607 controls so that the torque to the drive shaft 131 of the hybrid vehicle is supplied more from the motor 109 than from the internal combustion engine 111, and at the same time, the internal combustion engine operation control section 605 controls so that the torque of the internal combustion engine 111 is maintained constant (step S203).

Next, when the output of a mechanical transmission of the internal combustion engine 111 which is transmitted to the drive shaft 131 becomes equal to or smaller than a predetermined value, the hydraulic circuit control section 609 closes the shift valve 157A of the hydraulic circuit 118 (step S207). It is noted that the output of the mechanical transmission exceeds the predetermined value, the flowchart returns to step S203. When a predetermined period of time elapses since the operation performed in step S107, it is determined that the clutch 117 is released completely, and the hydraulic circuit control section 609 closes the shift valve 157 of the hydraulic circuit 118 (step S211).

EXAMPLE 3

Figure 15:
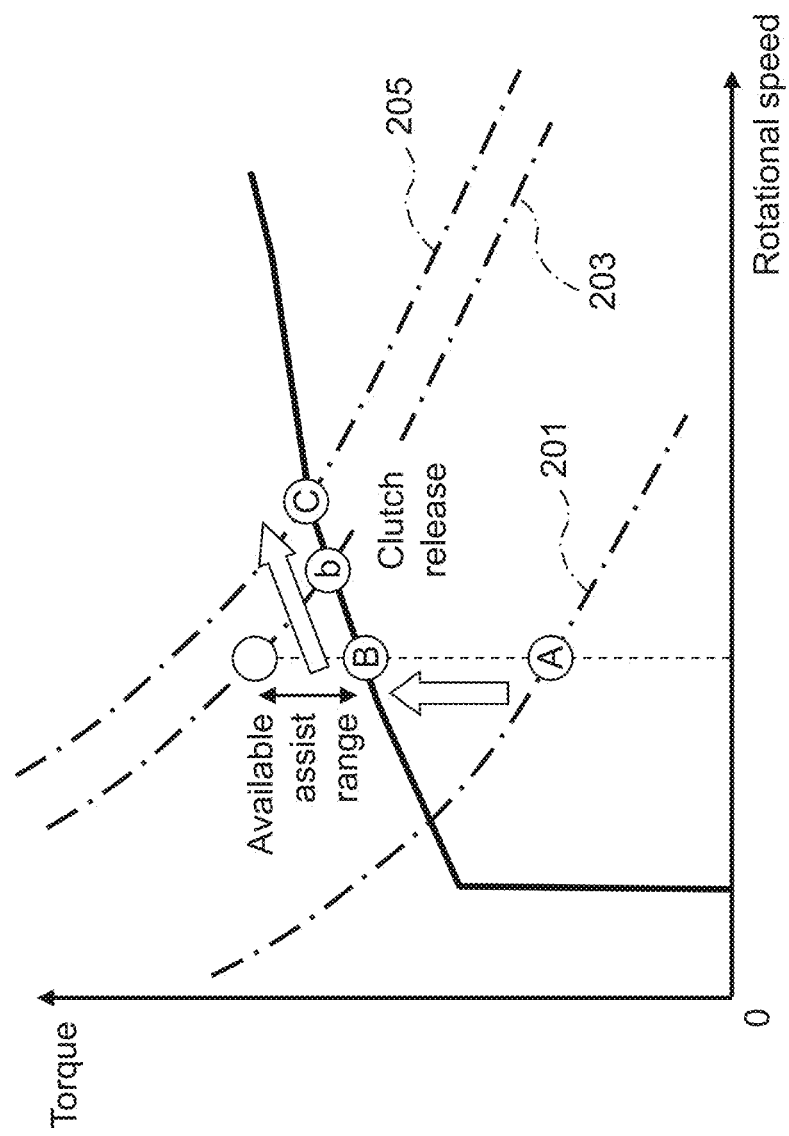
FIG. 15 is a graph showing a transition of an operation point of the internal combustion engine 111 when the clutch 117 is released in response to an increase in required driving force.
Figure 16:
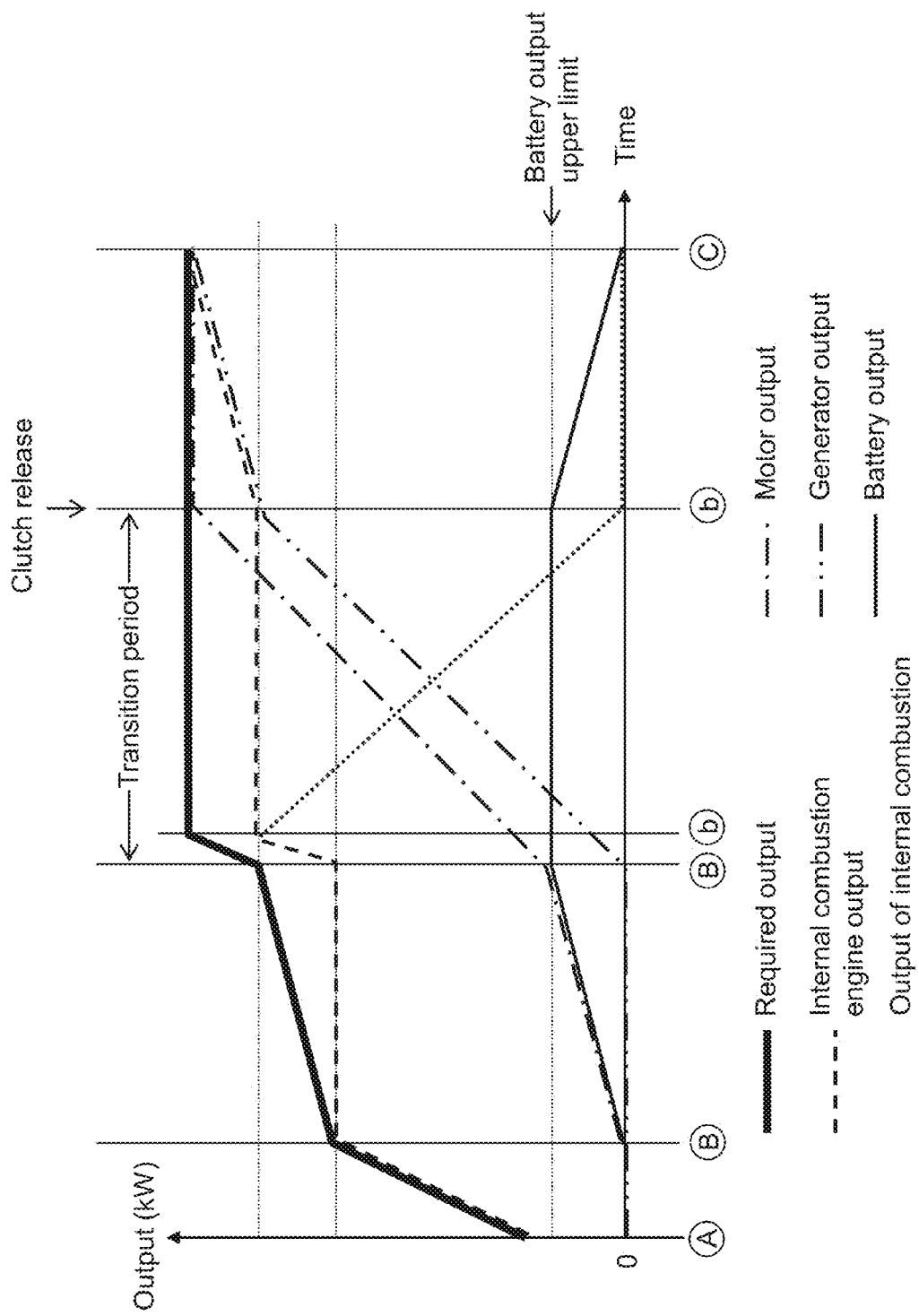
FIG. 16 is a time chart showing a change in each output when the clutch 117 is released in response to an increase in required driving force.

Hereinafter, controls performed by the management ECU 123 when the clutch 117 is released in response to an increase in required driving force will be described by reference to FIGS. 15 and 16. FIG. 15 is a graph showing a transition of an operation point of the internal combustion engine 111 when the clutch 117 is released in response to an increase in required driving force. FIG. 16 is a time chart showing a change in each output when the clutch 117 is released in response to an increase in required driving force. In the graph shown in FIG. 16, it is understood that no loss is involved in transmission of energy. When a required output is equal to an output indicated by an alternate long and short dash line denoted by reference numeral 201 with the clutch 117 applied, the internal combustion engine 111 is operated at an operation point A shown in FIG. 15. As this occurs, the motor 109 is not driven. When the required driving force is increased from this state due to an accelerator pedal operation by the driver, the management ECU 123 controls the internal combustion engine 111 so as to increase the torque while maintaining the rotational speed. As this occurs, the operation point of the internal combustion engine 111 is shifted upwards from the operation point A in the graph in FIG. 15. It is noted that an upper limit of the operation point of the internal combustion engine 111 is set on the BSFC bottom line.

Consequently, for example, when an output indicated by an alternate long and short dash line denoted by reference numeral 203 is required as a required driving force, the management ECU 123 controls the internal combustion engine 111 so as to be operated at an operation point B on the BSFC bottom line by increasing the torque while maintaining the rotational speed of the internal combustion engine 111. However, as shown in FIGS. 15 and 16, the output of the internal combustion engine 111 which is operated at the operation point B does not satisfy the required driving force. Because of this, the management ECU 123 instructs the motor ECU 125 so that the motor 109 outputs electric power corresponding to the shortage of output to the required driving force which cannot be satisfied by the output of the internal combustion engine 111 (=required driving force−output of the internal combustion engine 111).

As this occurs, the motor 109 is driven by electric power supplied from the battery 101. However, depending upon the condition of the battery 101, there may be a situation in which the motor 109 cannot output electric power corresponding to the shortage of output. For example, when the state of charge (SOC) of the battery 101 is low, there may be a situation in which the battery 101 cannot supply electric power required by the motor 109. In addition, when the temperature of the battery 101 (the battery temperature) is low, less electric power is outputted from the battery 101. Consequently, the battery ECU 127 calculates an output upper limit of the battery 101 (a battery output upper limit) based on the SOC and the battery temperature of the battery 101, and the management ECU 123 instructs the motor ECU 125 so as to cause the battery 101 to output electric power corresponding to the shortage of output within a range that the motor 109 can output (an available assist range).

Figure 19A:
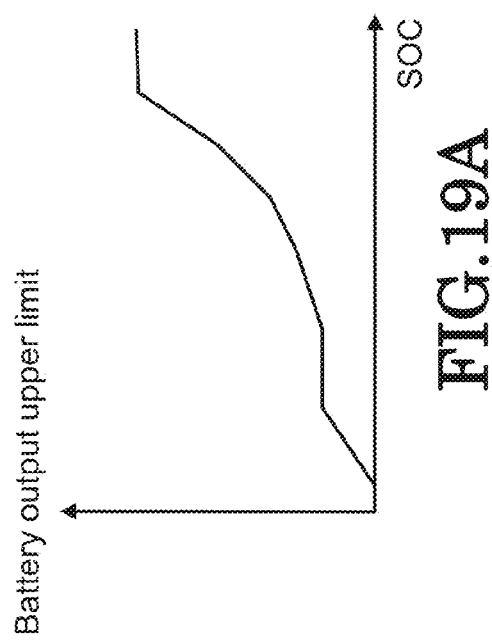
FIG. 19A is a graph showing a relation between SOC and battery output upper limit.
Figure 19B:
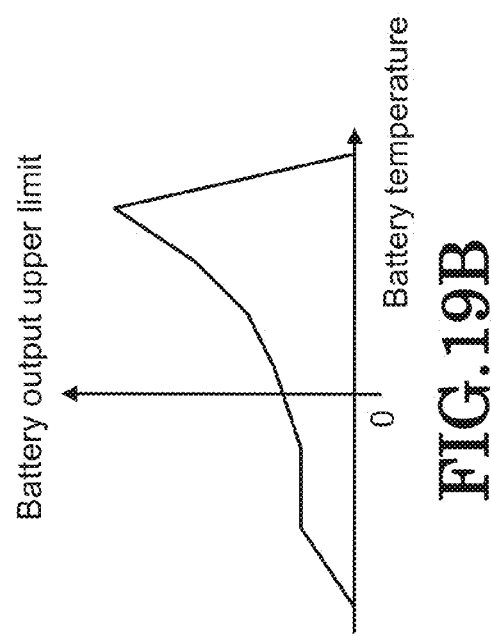
FIG. 19B is a graph showing a relation between battery temperature and battery output upper limit.
Figure 20:
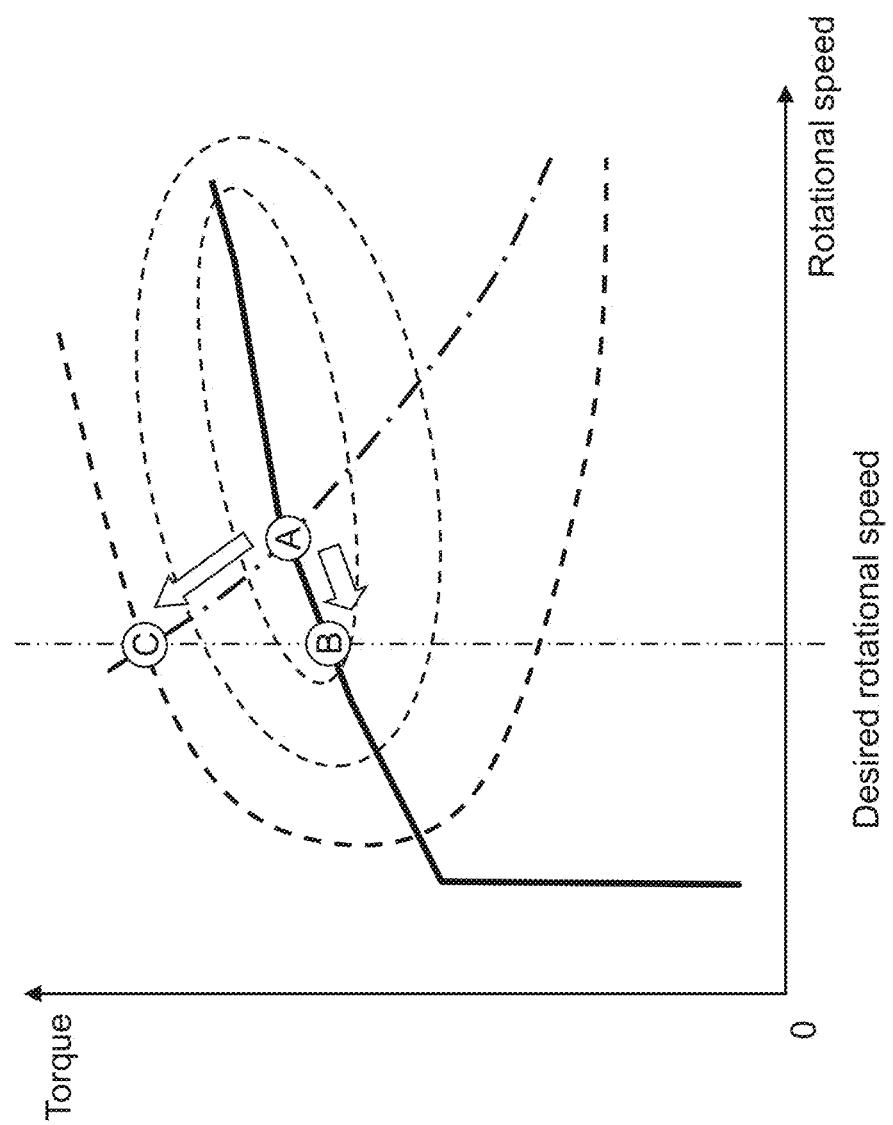
FIG. 20 is a graph showing an example of a characteristic of the internal combustion engine which drives a generator.
Figure 21:
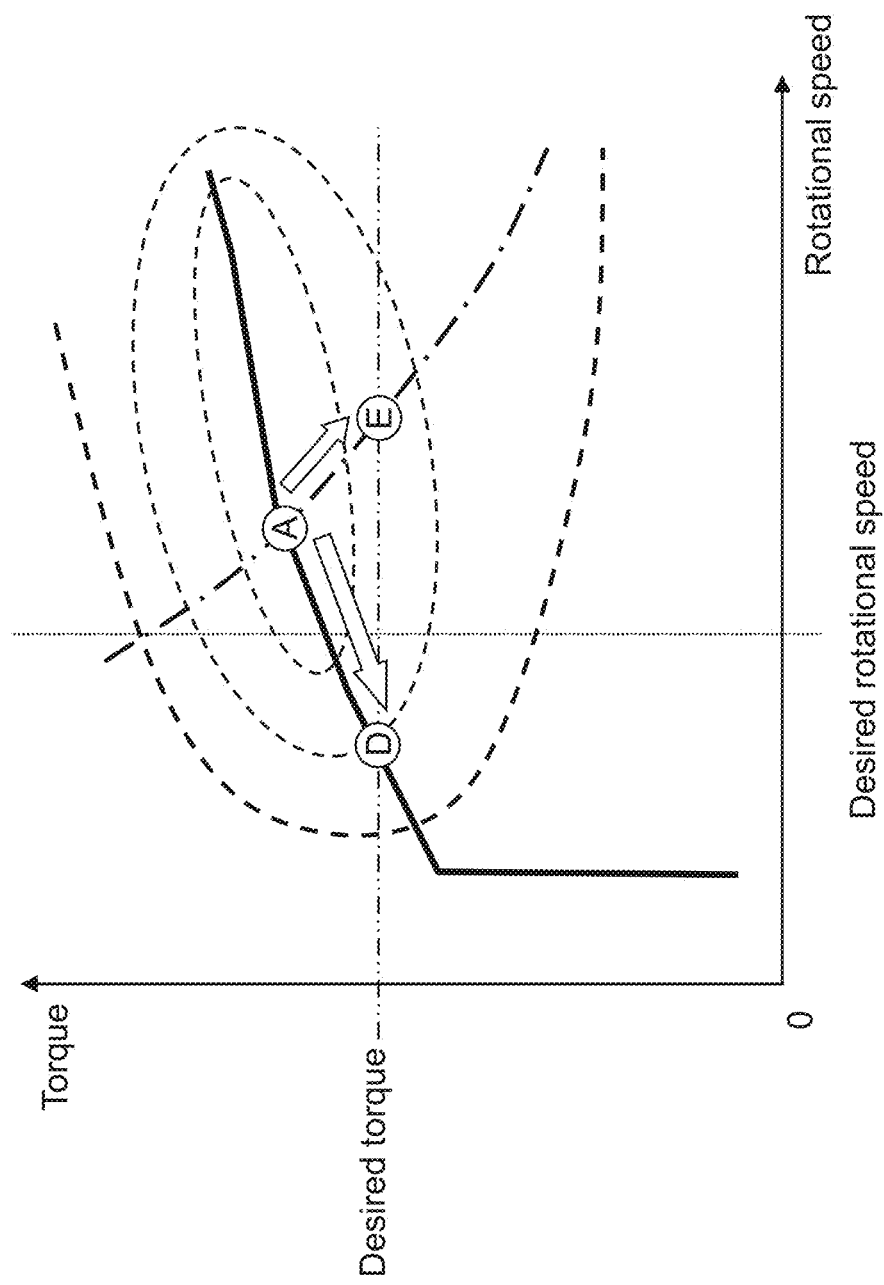
FIG. 21 is a graph showing an example of a characteristic of the internal combustion engine which drives the generator.

It is noted that the SOC of the battery 101 is calculated by the battery ECU 127 based on an integrated value of charged and discharged electric current of the battery 101 and a terminal voltage of the battery 101. In addition, the battery ECU 127 calculates a lower value of values obtained based on a relation between SOC and battery output upper limit shown in FIG. 19A and a relation between battery temperature and batter output upper limit shown in FIG. 19B as a battery output upper limit.

However, when for example, an output indicated by an alternate long and short dash line denoted by reference numeral 205 is required as a required driving force, the motor 109 cannot output electric power corresponding to a shortage of output to the required driving force which cannot be satisfied by the output of the internal combustion engine 111. Consequently, the management ECU 123 performs a control to shift the drive mode of the hybrid vehicle to the series drive. As this occurs, as shown in FIG. 16, the management ECU 123 controls respective outputs of the internal combustion engine 111, the generator 113 and the motor 109 with the clutch 117 kept applied and thereafter releases the clutch 117 to execute the shift to the series drive. The management ECU 123 shifts the operation point of the internal combustion engine 111 from an operation point B to an operation point b shown in FIG. 15 along the BSFC bottom line during the transition period to the series drive which lasts until the clutch 117 is released.

In addition, the motor ECU 125 controls the second inverter 115 so that a part of the output of the internal combustion engine 111 which is mechanically transmitted to the drive wheels 133 is used for the generator 113 to generate electric power, so as to increase the ratio of electrical transmission to mechanical transmission of the output of the internal combustion engine 111. Namely, as shown in FIG. 16, the mechanical transmission of the output of the internal combustion engine 111 is gradually decreased, while the electrical transmission of the output of the internal combustion engine 111 is gradually increased. The electrical transmission of the output of the internal combustion engine 111 is supplied to the generator 113, and the output (electric power) of the generator 113 is supplied to the motor 109. Consequently, as the electrical transmission of the output of the internal combustion engine 111 increases, the respective outputs of the generator 113 and the motor 109 increase.

The output of the generator 113 equals the output of the internal combustion engine 111 and the output of the motor 109 equals the required driving force at a point in time when the operation point of the internal combustion engine 111 shifts to the operation point b shown in FIG. 15 and the output through mechanical transmission becomes zero. As this occurs, the management ECU 123 controls the clutch 117 so as to be released. However, as this occurs, electric power to be supplied to the motor 109 includes the output of the battery 101 in addition to the output of the generator 113. After the clutch 117 is released, the management ECU 123 shifts the operation point of the internal combustion engine 111 to an operation point C shown in FIG. 15 and reduces the electric power supplied from the battery 101 to the motor 109 (the output of the battery 101) so as to be close to zero so that all the electric power that is supplied to the motor 109 is constituted by the output from the generator 113.

EXAMPLE 4

Figure 17:
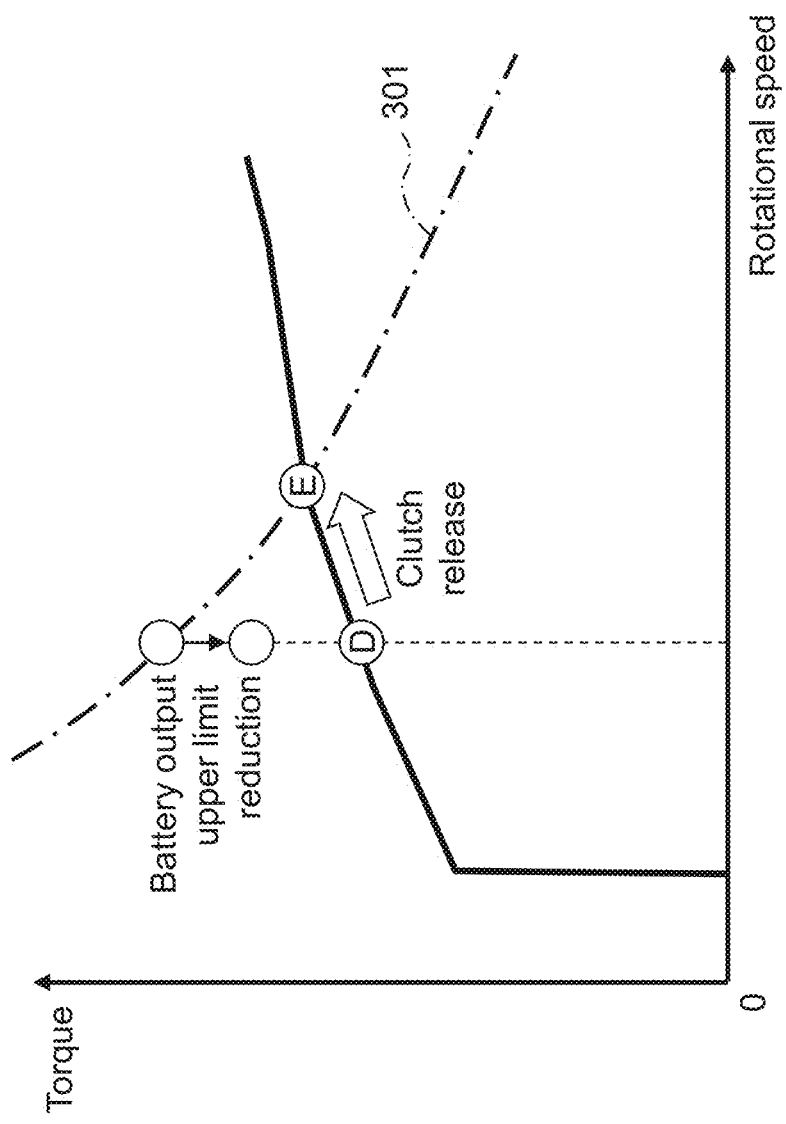
FIG. 17 is a graph showing a transition of an operation point of the internal combustion engine 111 when the clutch 117 is released in response to a change in the state of a battery 101.

Hereinafter, controls performed by the management ECU 123 when the clutch 117 is released in response to a change in increase in required driving force will be described by reference to FIGS. 17 and 18. FIG. 17 is a graph showing a transition of an operation point of the internal combustion engine 111 when the clutch 117 is released in response to a change in the state of the battery 101. FIG. 18 is a time chart showing a change in each output when the clutch 117 is released in response to a change in the state of the battery 101. It is understood that no loss exits in transmission of energy in the graph shown in FIG. 18. In an initial state shown in FIG. 18, with the clutch 117 applied, the internal combustion engine 111 is operated at an operation point D on the BSFC bottom line shown in FIG. 17, and the motor 109 is controlled so as to output electric power corresponding to a shortage of output to a required driving force indicated by an alternate long and short dash line denoted by reference numeral 301 in FIG. 17 which cannot be satisfied by the output of the internal combustion engine 111 (=required driving force−output of the internal combustion engine 111). As this occurs, there may be a situation in which the generator 113 cannot output the electric power corresponding to the shortage of output due to a reduction in output upper limit of the battery 101 (the battery output upper limit) which is triggered by a reduction in SOC or a reduction in battery temperature.

The battery ECU 127 calculates a battery output upper limit based on the SOC and battery temperature of the battery 101. When a total of the output of the motor 109 corresponding to the battery output upper limit (hereinafter, referred to an "output upper limit of the motor 109) and the output of the internal combustion engine 111 exceeds the required driving force, the management ECU 123 controls the respective outputs of the generator 113 and the motor 109 while maintaining the operation point of the internal combustion engine 111 at the operation point D on the BSFC bottom line with the clutch 117 kept applied and thereafter shift the drive mode of the hybrid vehicle to the series drive with the clutch 117 released as shown in FIG. 18.

During the transition period to the series drive which lasts until the clutch 117 is released the management ECU 123 controls the second inverter 115 so that a part of the output of the internal combustion engine 111 which is mechanically transmitted to the drive wheels 133 is used for the generator 113 to generate electric power, so as to increase the ratio of electrical transmission to mechanical transmission of the output of the internal combustion engine 111. Namely, as shown in FIG. 18, the mechanical transmission of the output of the internal combustion engine 111 is gradually decreased, while the electrical transmission of the output of the internal combustion engine 111 is gradually increased. The electrical transmission of the output of the internal combustion engine 111 is supplied to the generator 113, and the output (electric power) of the generator 113 is supplied to the motor 109. Consequently, as the electrical transmission of the output of the internal combustion engine 111 increases, the respective outputs of the generator 113 and the motor 109 increase.

The output of the generator 113 equals the output of the internal combustion engine 111 and the output of the motor 109 equals the required driving force at a point in time when the mechanical transmission of the output of the internal combustion engine 111 becomes zero. As this occurs, the management ECU 123 controls the clutch 117 so as to be released. However, as this occurs, electric power to be supplied to the motor 109 includes the output of the battery 101 in addition to the output of the generator 113. After the clutch 117 is released, the management ECU 123 shifts the operation point of the internal combustion engine 111 to an operation point E shown in FIG. 17 and reduces the electric power supplied from the battery 101 to the motor 109 (the output of the battery 101) so as to be close to zero so that all the electric power that is supplied to the motor 109 is constituted by the output from the generator 113.

Thus, as has been described heretofore, in the event that the controls by the management ECU 123 that have been described above are executed in the hybrid vehicle of this embodiment, in shifting the drive mode of the hybrid vehicle to the series drive due to the required driving force exceeding the total of the output of the internal combustion engine 111 and the output of the motor 109 which is triggered by an increase in required driving force or a reduction in battery output upper limit, the internal combustion engine 111 and the motor 109 output together the driving force corresponding to the required driving force. Consequently, no shock is produced in shifting of the drive mode of the hybrid vehicle from the drive mode in which the internal combustion engine 111 is used as the drive source to the series drive mode, and even though the clutch 117 is released, the driver does not feel the sensation of physical disorder. In addition, because an output which surpasses the battery output upper limit is not required on the battery 101, the battery 101 is used in an appropriate fashion. Consequently, a battery of a large capacity does not have to be used only for a temporary situation. Further, because the internal combustion engine 111 is operated at the operation point on the BSFC bottom line during the transition period to the series drive, the fuel economy is not deteriorated.

While the invention has been described in detail and by reference to the specific embodiment, it is obvious to those skilled in the art to which the invention pertains that various alterations and modifications can be made thereto without departing from the spirit and scope of the invention.

DESCRIPTION OF REFERENCE NUMERALS 101 battery (BATT)
103 temperature sensor (TEMP)
105 converter (CONV)
107 first inverter (first INV)
109 motor (MOT)
111 internal combustion engine (ENG)
113 generator (GEN)
115 second inverter (second INV)
117 clutch
118 hydraulic circuit
119 gearbox
121 vehicle speed sensor
123 management ECU (FI/MG ECU)
125 motor ECU (MOT/GEN ECU)
127 battery ECU (BATT ECU)
131 drive shaft
133 drive wheel
501 required driving force deriving section
503 engine direct coupled drive shifting determination section
505 applying rotational speed calculation section
507 internal combustion engine operation control section
509 hydraulic circuit control section
511 torque shifting control section
601 required driving force deriving section
603 series drive shifting determination section
605 internal combustion engine operation control section
607 torque shifting determination section
609 hydraulic circuit control section

The invention claimed is:

1. A hybrid vehicle, comprising:
an internal combustion engine;
a generator which is driven by the internal combustion engine to generate electric power;
a battery which supplies electric power to a motor;
the motor which is connected to drive wheels and which is driven by electric power supplied from at least one of the battery and the generator; and
a power transmission engaging/disengaging portion which is disposed between the generator and the drive wheels so as to engage or disengage a power transmission path from the internal combustion engine to the drive wheels via the generator,
wherein the hybrid vehicle is driven by power from at least one of the motor and the internal combustion engine, and
the hybrid vehicle comprises:
an engine direct coupled drive shifting determination section for determining whether or not the hybrid vehicle shifts from a series drive in which the motor which is driven by electric power generated by the generator based on power of the internal combustion engine is used as a drive source to an engine direct coupled drive in which at least the internal combustion engine is used as a drive source with the power transmission engaging/disengaging portion applied;
an applying rotational speed deriving section for deriving a rotational speed at a drive wheel side of the power transmission engaging/disengaging portion which corresponds to a driving speed of the hybrid vehicle as an applying rotational speed of the internal combustion engine at which the power transmission engaging/disengaging portion is applied;
an internal combustion engine control section for controlling an operation of the internal combustion engine; and
an engaging/disengaging control section for controlling the power transmission engaging/disengaging portion so as to be applied when a difference in rotational speed between the rotational speed of the internal combustion engine and the applying rotational speed becomes equal to or smaller than a predetermined value after the engine direct coupled drive shifting determination section determines a shift to the engine direct coupled drive.

2. The hybrid vehicle according to claim 1,
wherein the internal combustion engine control section controls the internal combustion engine so as to be operated on a best fuel economy line which connects operation points where a least fuel consumption rate is obtained, in a case that a rotational speed of the internal combustion engine is higher than the applying rotational speed when the hybrid vehicle executes the series drive at a predetermined vehicle speed or faster.

3. The hybrid vehicle according to claim 1, comprising:
a required driving force deriving section for deriving a driving force required on the hybrid vehicle based on an accelerator pedal opening which corresponds to an accelerator pedal operation in the hybrid vehicle and a driving speed of the hybrid vehicle,
wherein the internal combustion engine control section controls the internal combustion engine so as to be operated on an equioutput line which connects operation points where an output corresponding to the required driving force derived by the required driving force deriving section can be maintained, in a case that a rotational speed of the internal combustion engine is lower than the applying rotational speed when the hybrid vehicle executes the series drive at a predetermined vehicle speed or faster.

4. The hybrid vehicle according to claim 3,
wherein an energy transmission efficiency from the internal combustion engine to the drive wheels at an operation point which is reached as a result of an operation point of the internal combustion engine moving on the equioutput line and where the rotational speed of the internal combustion engine coincides with the applying rotational speed is such that a mechanical efficiency is better than an electric efficiency.

5. A hybrid vehicle, comprising:
an internal combustion engine;
a generator which is driven by the internal combustion engine to generate electric power;
a battery which supplies electric power to a motor;
the motor which is connected to drive wheels and which is driven by electric power supplied from at least one of the battery and the generator; and
a power transmission engaging/disengaging portion which is disposed between the generator and the drive wheels so as to engage or disengage a power transmission path from the internal combustion engine to the drive wheels via the generator,
wherein the hybrid vehicle is driven by power from at least one of the motor and the internal combustion engine, and
the hybrid vehicle comprises:
a series drive shifting determination section for determining whether or not the hybrid vehicle shifts from an engine direct coupled drive in which at least the internal combustion engine is used as a drive source to a series drive in which the motor which is driven by electric power generated by the generator based on power of the internal combustion engine is used as a drive source with the power transmission engaging/disengaging portion released;
a transmission ratio changing section for changing a ratio of an electrical transmission to a mechanical transmission of an output of the internal combustion engine; and
an engaging/disengaging control section for controlling the power transmission engaging/disengaging portion so as to be released when an output of the internal combustion engine through the mechanical transmission becomes equal to or smaller than a predetermined value after the series drive shifting determination section determines a shift to the series drive.

6. The hybrid vehicle according to claim 5, further comprising:
a battery output control section for controlling an electric power supply from the battery to the motor; and
an internal combustion engine control section for controlling an operation of the internal combustion engine,
wherein after the power transmission engaging/disengaging portion is released,
the battery output control section decreases the electric power supplied from the battery to the motor, and
the internal combustion engine control section controls the internal combustion engine so as to be operated on a best fuel economy line which connects operation points where a least fuel consumption rate is obtained so as to increase the output of the internal combustion engine in association with the decrease of the electric power supplied from the battery to the motor.

7. The hybrid vehicle according to claim 5, comprising:
a required driving force deriving section for deriving a driving force required on the hybrid vehicle based on an accelerator pedal opening which corresponds to an accelerator pedal operation in the hybrid vehicle and a driving speed of the hybrid vehicle; and
an internal combustion engine control section for controlling an operation of the internal combustion engine,
wherein when the required driving force derived by the required driving force deriving section increases when the hybrid vehicle is driven by using the internal combustion engine as a drive source with the power transmission engaging/disengaging portion applied, the internal combustion engine control section increases the output of the internal combustion engine so as to satisfy the required drive force until an operation point reaches a best fuel economy line which connects operation points where a least fuel consumption rate is obtained, and
when the required driving force exceeds the output of the internal combustion engine operated at an operation point on the best fuel economy line, the internal combustion engine control section operates the internal combustion engine on the best fuel economy line and the motor which is driven by electric power supplied from the battery outputs electric power which is good enough to compensate for a shortage of the output of the internal combustion engine to the required driving force.

8. The hybrid vehicle according to claim 5, comprising:
an internal combustion engine control section for controlling an operation of the internal combustion engine,
wherein the internal combustion engine control section controls the operation of the internal combustion engine so as to maintain torque of the internal combustion engine constant by controlling torque of the motor for a time period from a start of changing the ratio of the electrical transmission to the mechanical transmission of the output of the internal combustion engine by the transmission ratio changing section to a completion of opening of the power transmission path.

9. A control method of a hybrid vehicle comprising:
an internal combustion engine;
a generator which is driven by the internal combustion engine to generate electric power;
a battery which supplies electric power to a motor;
the motor which is connected to drive wheels and which is driven by electric power supplied from at least one of the battery and the generator; and
a power transmission engaging/disengaging portion which is disposed between the generator and the drive wheels so as to engage or disengage a power transmission path from the internal combustion engine to the drive wheels via the generator,
wherein the hybrid vehicle is driven by power from at least one of the motor and the internal combustion engine, and
the control method includes the steps of:
determining whether or not the hybrid vehicle shifts from a series drive in which the motor which is driven by electric power generated by the generator based on power of the internal combustion engine is used as a drive source to an engine direct coupled drive in which at least the internal combustion engine is used as a drive source with the power transmission engaging/disengaging portion applied,
deriving a rotational speed at a drive wheel side of the power transmission engaging/disengaging portion which corresponds to a driving speed of the hybrid vehicle as an applying rotational speed of the internal combustion engine at which the power transmission engaging/disengaging portion is applied, and
controlling the power transmission engaging/disengaging portion so as to be applied when a difference in rotational speed between the rotational speed of the internal combustion engine and the applying rotational speed becomes equal to or smaller than a predetermined value by controlling an operation of the internal combustion engine after a shift to the engine direct coupled drive is determined.

10. A control method of a hybrid vehicle comprising:
an internal combustion engine;
a generator which is driven by the internal combustion engine to generate electric power;
a battery which supplies electric power to a motor;
the motor which is connected to drive wheels and which is driven by electric power supplied from at least one of the battery and the generator; and
a power transmission engaging/disengaging portion which is disposed between the generator and the drive wheels so as to engage or disengage a power transmission path from the internal combustion engine to the drive wheels via the generator,
wherein the hybrid vehicle is driven by power from at least one of the motor and the internal combustion engine, and
the control method includes the steps of:
determining whether or not the hybrid vehicle shifts from an engine direct coupled drive in which at least the internal combustion engine is used as a drive source to a series drive in which the motor which is driven by electric power generated by the generator based on power of the internal combustion engine is used as a drive source with the power transmission engaging/disengaging portion released,
changing a ratio of an electrical transmission to a mechanical transmission of an output of the internal combustion engine, and
controlling the power transmission engaging/disengaging portion so as to be released when an output of the internal combustion engine through the mechanical transmission becomes equal to or smaller than a predetermined value after a shift to the series drive is determined.

* * * * *